United States Patent
Fung et al.

(10) Patent No.: US 10,614,326 B2
(45) Date of Patent: Apr. 7, 2020

(54) SYSTEM AND METHOD FOR VEHICLE CONTROL BASED ON OBJECT AND COLOR DETECTION

(71) Applicant: Honda Motor Co., Ltd., Tokyo (JP)

(72) Inventors: Kin C. Fung, Dublin, OH (US); Timothy J. Dick, Dublin, OH (US); Dhanashree Palande, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/127,912

(22) Filed: Sep. 11, 2018

(65) Prior Publication Data
US 2019/0012551 A1    Jan. 10, 2019

Related U.S. Application Data

(63) Continuation-in-part of application No. 15/450,184, filed on Mar. 6, 2017.

(51) Int. Cl.
*G06K 9/00* (2006.01)
*G06K 9/46* (2006.01)
(Continued)

(52) U.S. Cl.
CPC ......... *G06K 9/00825* (2013.01); *B60W 30/00* (2013.01); *G06K 9/4652* (2013.01);
(Continued)

(58) Field of Classification Search
CPC . G06K 9/00845; G06K 9/4652; G08G 1/0962
See application file for complete search history.

(56) References Cited

U.S. PATENT DOCUMENTS 7,365,769 B1    4/2008   Mager
7,466,841 B2 *  12/2008  Bahlmann .......... G06K 9/00818
                                            382/103
(Continued)

FOREIGN PATENT DOCUMENTS

WO       2016203616        12/2016
WO    WO-2016203616 A1 *   12/2016    ............... G06T 1/00

OTHER PUBLICATIONS

Joseph Redmon, You Only Look Once: Unified, Real-Time Object Detection, May 9, 2016, arXiv:1506.02640v5 [cs.CV], p. 1-10. (Year: 2016).*

(Continued)

*Primary Examiner* — Brenda C Bernardi
(74) *Attorney, Agent, or Firm* — Rankin, Hill & Clark LLP

(57) ABSTRACT

A system and method for vehicle control that includes receiving an image from an imaging system. The system and method also includes classifying the traffic indicator having the color portion based on executing "You Only Look Once" (YOLO) object detection of the image and localizing the traffic indicator having the color portion with respect to a vehicle based on executing the YOLO object detection of the image. The system and method additionally includes performing "Binary Large Object" (blob) analysis based on red color components and green color components of the image to determine a color of the color portion of the traffic indicator. The system and method further includes controlling a vehicle system of the vehicle based on the classification of the traffic indicator, the location of the traffic indicator with respect to the vehicle, and the color of the color portion of the traffic indicator.

20 Claims, 12 Drawing Sheets

(51) Int. Cl.

| | | |
|---|---|---|
| *G06K 9/62* | (2006.01) | |
| *B60W 30/00* | (2006.01) | |
| *G08G 1/0967* | (2006.01) | |
| *G08G 1/0962* | (2006.01) | |
| *G08B 7/06* | (2006.01) | |
| *G08B 6/00* | (2006.01) | |
| *G05D 1/02* | (2020.01) | |
| *G08G 1/095* | (2006.01) | |
| *G08B 21/06* | (2006.01) | |

(52) U.S. Cl.
CPC ......... *G06K 9/6262* (2013.01); *G06K 9/6267* (2013.01); *G08G 1/09623* (2013.01); *G08G 1/096708* (2013.01); *G05D 1/0246* (2013.01); *G05D 2201/0213* (2013.01); *G08B 6/00* (2013.01); *G08B 7/06* (2013.01); *G08B 21/06* (2013.01); *G08G 1/095* (2013.01)

(56) References Cited

U.S. PATENT DOCUMENTS

| | | | |
|---|---|---|---|
| 8,324,552 B2 | 12/2012 | Schofield et al. | |
| 9,318,020 B2 | 4/2016 | Salomonsson et al. | |
| 9,721,171 B2* | 8/2017 | Moesle | G06K 9/00825 |
| 9,747,508 B2* | 8/2017 | Mizutani | G06K 9/00825 |
| 9,779,315 B2* | 10/2017 | Yamanoi | G01C 21/26 |
| 9,792,519 B2* | 10/2017 | Kido | G06K 9/2018 |
| 9,796,386 B2* | 10/2017 | Ferguson | G05D 1/0231 |
| 9,857,800 B2* | 1/2018 | Ben Shalom | B60W 30/00 |
| 2005/0036660 A1 | 2/2005 | Otsuka et al. | |
| 2006/0280361 A1* | 12/2006 | Umeda | G06K 9/0061 |
| | | | 382/167 |
| 2011/0182475 A1* | 7/2011 | Fairfield | G06K 9/00825 |
| | | | 382/104 |
| 2011/0291859 A1 | 12/2011 | Kreis et al. | |
| 2012/0140084 A1* | 6/2012 | Wang | G06T 7/001 |
| | | | 348/207.1 |
| 2012/0200490 A1* | 8/2012 | Inada | A61B 3/113 |
| | | | 345/156 |
| 2012/0215403 A1* | 8/2012 | Tengler | B60W 50/12 |
| | | | 701/36 |
| 2012/0242819 A1* | 9/2012 | Schamp | G08B 21/06 |
| | | | 348/78 |
| 2012/0269391 A1* | 10/2012 | Saito | G08G 1/165 |
| | | | 382/103 |
| 2012/0288145 A1* | 11/2012 | Kido | G06K 9/00791 |
| | | | 382/103 |
| 2012/0288146 A1* | 11/2012 | Kido | G06K 9/00805 |
| | | | 382/103 |
| 2012/0288149 A1* | 11/2012 | Kido | G06K 9/00825 |
| | | | 382/103 |
| 2012/0288150 A1* | 11/2012 | Kido | G06K 9/2018 |
| | | | 382/103 |
| 2012/0288151 A1* | 11/2012 | Kido | G08G 1/165 |
| | | | 382/103 |
| 2013/0253754 A1* | 9/2013 | Ferguson | G05D 1/0231 |
| | | | 701/28 |
| 2013/0342698 A1* | 12/2013 | Thompson | G06K 9/2018 |
| | | | 348/148 |
| 2014/0132769 A1* | 5/2014 | Kido | G06K 9/00791 |
| | | | 348/148 |
| 2015/0009318 A1 | 1/2015 | Peng | |
| 2015/0109429 A1* | 4/2015 | Inoue | A61B 5/18 |
| | | | 348/78 |
| 2015/0124096 A1* | 5/2015 | Koravadi | G06K 9/00825 |
| | | | 348/148 |
| 2015/0294167 A1* | 10/2015 | Zhang | G06K 9/00825 |
| | | | 382/103 |
| 2016/0148063 A1* | 5/2016 | Hong | G06K 9/00825 |
| | | | 382/103 |
| 2016/0156881 A1* | 6/2016 | Guan | H04N 7/185 |
| | | | 348/148 |
| 2016/0284100 A1* | 9/2016 | Sharma | G06T 7/11 |
| 2016/0301923 A1* | 10/2016 | Ichige | H04N 13/239 |
| 2016/0328629 A1* | 11/2016 | Sinclair | H04N 5/2253 |
| 2016/0328975 A1* | 11/2016 | Tokita | G08G 1/09623 |
| 2016/0371552 A1* | 12/2016 | Oki | G06K 9/00825 |
| 2016/0379069 A1* | 12/2016 | Kasaoki | G06K 9/00825 |
| | | | 348/148 |
| 2016/0379070 A1* | 12/2016 | Kasaoki | G06K 9/00825 |
| | | | 348/148 |
| 2017/0017850 A1* | 1/2017 | Oki | G06K 9/00825 |
| 2017/0024622 A1* | 1/2017 | Mizutani | G06K 9/00825 |
| 2017/0043715 A1* | 2/2017 | Osugi | G08G 1/16 |
| 2017/0091566 A1* | 3/2017 | Kasaoki | H04N 5/2353 |
| 2017/0103274 A1* | 4/2017 | Oki | H04N 7/183 |
| 2017/0103275 A1* | 4/2017 | Yamanoi | G01C 21/26 |
| 2017/0120821 A1* | 5/2017 | Guan | G06K 9/00825 |
| 2017/0144585 A1* | 5/2017 | Ogawa | G06K 9/4661 |
| 2017/0178322 A1* | 6/2017 | Hakuk | G06T 7/0012 |
| 2017/0200061 A1* | 7/2017 | Julian | G08G 1/04 |
| 2017/0206427 A1* | 7/2017 | Ginsberg | G06K 9/00724 |
| 2017/0223367 A1* | 8/2017 | Stessen | H04N 1/6027 |
| 2017/0262709 A1* | 9/2017 | Wellington | G05D 1/0088 |
| 2017/0372160 A1* | 12/2017 | Kido | G06K 9/2018 |
| 2018/0022358 A1* | 1/2018 | Fung | B60W 40/08 |
| | | | 701/36 |
| 2018/0144203 A1* | 5/2018 | Moosaei | G06K 9/00825 |
| 2018/0300564 A1* | 10/2018 | Kwant | G06K 9/00818 |
| 2018/0307925 A1* | 10/2018 | Wisniowski | G06K 9/00825 |
| 2019/0180467 A1* | 6/2019 | Li | G06T 7/521 |
| 2019/0213747 A1* | 7/2019 | Ma | G06K 9/6267 |

OTHER PUBLICATIONS

Jian-Gang Wang, Traffic Llight Recognition With High Dynamic Range Imaging and Deep Learning, Jul. 25, 2018, IEEE Transactions on Intelligent Transportation Systems, vol. 20, Issue 4, p. 1341-1352. (Year: 2018).*

Karsten Behrendt, A deep learning approach to traffic lights: Detection, tracking, and classification, Jul. 24, 2017, 2017 IEEE International Conference on Robotics and Automation (ICRA), p. 1370-1377. (Year: 2017).*

Sung, et al., "Real-time Traffic Light Recognition on mobile Devices with Geometry-Based Filtering", Department of Computer Science and Information Engineering, Department of Electrical Engineering, National Taiwan University, Taipei, Taiwan, 7 pages.

Diaz, M., et al., A Survey on Traffic Light Detection, Conference: New Trends in Image Analysis and Processins—ICIAP 2015 Workshops, Lecture Notes in Computer Science (LNCS) 9281, pp. 1-8, Springer International Publishing Switzerland. (Year: 2015).

Diaz-Cabrera, M., et al., Suspended Traffic Lights Detection and Distance Estimation Using Color Features, 15th International IEEE Conference on Intelligent Transportation Systems, 2012, pp. 1315-1320. (Year: 2012).

Fairfield, N., et al., Traffic Light Mapping and Detection, International Conference on Robotics and Automation (ICRA), 2011, pp. 5421-5426, IEEE. (Year: 2011).

Haltakov, V., et al., Semantic Segmentation Based Traffic Light Detection at Day and at Night, Pattern Recognition, Lecture Notes in Computer Science (LNCS) 9358, Oct. 2015, pp. 446-457. (Year: 2015).

Omachi, M., et al., Traffic Light Detection with Color and Edge Information, International Conference on Computer Science and Information Technology, 2009, pp. 284-287, IEEE. (Year: 2009).

Zhang, Y., et al., A Multi-Feature Fusion Based Traffic Light Recognition Algorithm for Intelligent Vehicles, Proceedings of the 33rd Chinese Control Conference (CCC), 2014, pp. 4924-4929, IEEE. (Year: 2014).

Yang, X., et al., A Real Time Traffic Light Recognition System, International Journal of Information Acquisition, 2008, vol. 5, No. 2, pp. 149-161, World Scientific Publishing Company. (Year: 2008).

Zhou, X., et al., A Traffic Light Recognition Algorithm Based on Compressive Tracking, International Journal of Hybrid Information Technology, 2015, vol. 8, No. 6, pp. 323-332. (Year: 2015).

(56) References Cited

OTHER PUBLICATIONS

Office Action of U.S. Appl. No. 15/450,184 dated Nov. 20, 2018, 21 pages.

* cited by examiner

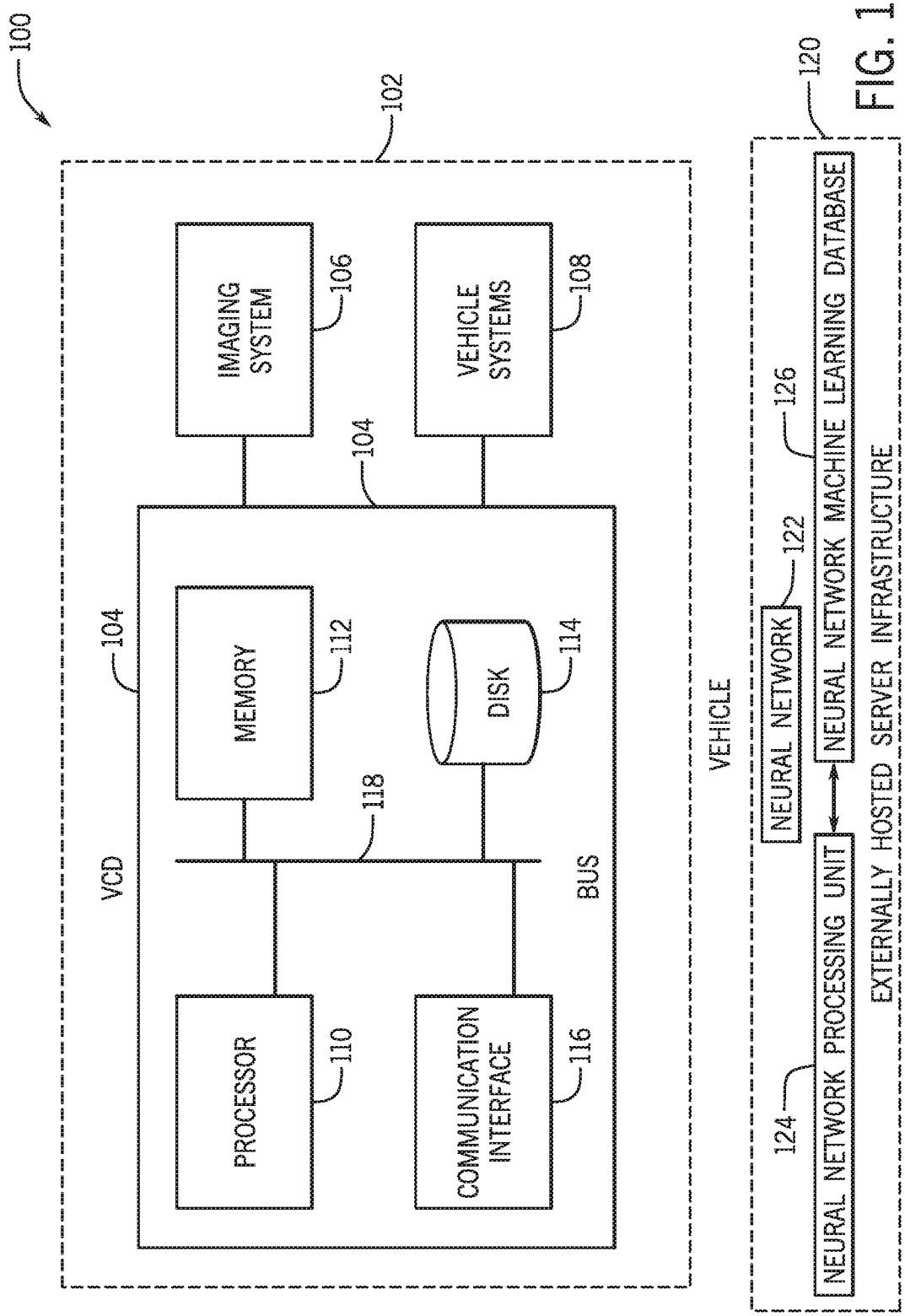

SYSTEM AND METHOD FOR VEHICLE CONTROL BASED ON OBJECT AND COLOR DETECTION

CROSS-REFERENCE TO RELATED APPLICATION

This application is a continuation-in-part of, and claims priority to, U.S. application Ser. No. 15/450,184, filed on Mar. 6, 2017, which is expressly incorporated herein by reference.

BACKGROUND

Advanced Driver Assistance Systems (ADAS) can use detection of traffic lights and/or traffic signs to provide vehicle safety and convenience functions. In particular, ADAS can accurately distinguishing various features of a driving scene to determine when control and what type of control is required. For example, red color (e.g., red light) must be distinguished from green color (e.g., green light). In some scenarios, different types of traffic indicators must also be distinguished (e.g., traffic light, vehicle brake lights). Object detection systems can be utilized to analyze real time images of the driving scene to classify types of objects. However, common detection systems can use a sliding window approach to object detection that can be inefficient and time consuming.

Furthermore, the classification of traffic indicators and further recognition of red color and green color along with information about the driver can be used to infer the driver's intent to control the vehicle to provide an adequate response and/or warning. For example, driver information (e.g., eye gaze, head pose, use of a mobile device) can be used in addition to classification of driving scene features including traffic indicators to provide vehicle safety and convenience functions.

BRIEF DESCRIPTION

According to one aspect, a computer-implemented method for vehicle control includes receiving an image from an imaging system. The image including a traffic indicator having a color portion. The method also includes classifying the traffic indicator having the color portion based on executing "You Only Look Once" (YOLO) object detection of the image and localizing the traffic indicator having the color portion with respect to a vehicle based on executing the YOLO object detection of the image. The method additionally includes performing "Binary Large Object" (blob) analysis based on red color components and green color components of the image to determine a color of the color portion of the traffic indicator. The method further includes controlling a vehicle system of the vehicle based on the classification of the traffic indicator, the location of the traffic indicator with respect to the vehicle, and the color of the color portion of the traffic indicator.

According to another aspect, a system for vehicle control that includes a memory storing instructions when executed by a processor cause the processor to: receive an image from an imaging system. The image including a traffic indicator having a color portion. The instructions also cause the processor to receive an image from an imaging system, the image including a traffic indicator having a color portion and classify the traffic indicator having the color portion based on executing "You Only Look Once" (YOLO) object detection of the image. The instructions additionally cause the processor to perform "Binary Large Object" (blob) analysis based on red color components and green color components of the image to determine a color of the color portion of the traffic indicator. The instructions further cause the processor to control a vehicle system of the vehicle based on the classification of the traffic indicator, the location of the traffic indicator with respect to the vehicle, and the color of the color portion of the traffic indicator.

According to a further aspect, non-transitory computer readable storage medium storing instructions that when executed by a computer, which includes a processor perform a method. The method includes receiving an image from an imaging system. The image including a traffic indicator having a color portion. The method also includes classifying the traffic indicator having the color portion based on executing "You Only Look Once" (YOLO) object detection of the image and localizing the traffic indicator having the color portion with respect to a vehicle based on executing the YOLO object detection of the image. The method additionally includes performing "Binary Large Object" (blob) analysis based on red color components and green color components of the image to determine a color of the color portion of the traffic indicator. The method further includes controlling a vehicle system of the vehicle based on the classification of the traffic indicator, the location of the traffic indicator with respect to the vehicle, and the color of the color portion of the traffic indicator.

BRIEF DESCRIPTION OF THE DRAWINGS

FIG. 1 is a block diagram illustrating a system for vehicle control based on red color and green color detection according to an exemplary embodiment;

DETAILED DESCRIPTION

Figure 2A:
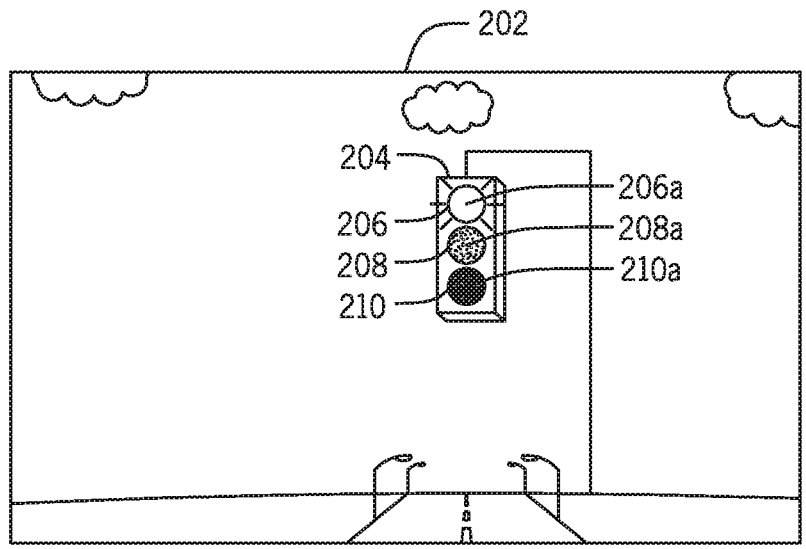
FIG. 2A illustrates an example image including traffic indicators, namely, a traffic light according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A "vehicle sensor," as used herein can include, but is not limited to, any sensor used in any vehicle system for detecting a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

Referring now to the drawings, wherein the showings are for purposes of illustrating one or more exemplary embodiments and not for purposes of limiting the same, FIG. 1 is a block diagram of an exemplary vehicle image processing system 100 for implementing vehicle control based object and color detection of traffic indicators according to an exemplary embodiment. The components of the system 100, as well as the components of other systems, hardware architectures, and software architectures discussed herein, can be combined, omitted, or organized into different architectures for various embodiments.

The system 100 can be part of a vehicle 102, and can include a vehicle computing device (VCD) 104, an imaging system 106, and vehicle systems 108. The VCD 104 can include provisions for processing, communicating and interacting with various components of the vehicle 102 and other components of the system 100. In one embodiment, the VCD 104 can be implemented with the vehicle 102, for example, as part of a telematics unit, a head unit, a navigation unit, an infotainment unit, an electronic control unit, among others. In other embodiments, the VCD 104 can be implemented remotely from the vehicle 102, for example, with a portable device (not shown) or a device connected via a network (not shown).

The VCD 104 can use the imaging system 106 to capture images surrounding the environment of the vehicle 102. For example, the imaging system 106 can capture images/video (e.g., color images, monochrome images) of a space within the front path (e.g., forward looking) of the vehicle 102. The imaging system 106 can include one or more cameras (e.g., stereo cameras, three-dimensional cameras, image sensors) that can be mounted on the vehicle 102, for example, mounted on a windshield, a front dashboard, a grill, a rear-view mirror, among others. In another embodiment, the imaging system 106 can include a portable device (not shown) with image capture hardware and functionality (e.g., a camera). The images/video provided by the imaging system 106 are in two-dimensional format, however, other formats (e.g., stereo images, three-dimensional images) can also be provided. In some embodiments, the imaging system 106 can capture images at different time intervals. As discussed below, images/video captured by the imaging system 106 can be analyzed to detect, classify, and localize one or more objects located within a surrounding environment of the vehicle 102 (e.g., a predetermined distance from the vehicle 102). Additionally, the images/video captured by the imaging system 106 can be analyzed to determine particular colors of a color portion of a traffic indicator based on analysis of red color components and green color components of the image.

In some embodiments, the imaging system 106 can be controlled for image pre-processing and/or camera customization. The settings of the imaging system 106 can be controlled and/or customized to ensure red and green colors are captured and enhanced using light noise reductions. In other embodiments, post-processing of the image captured, as discussed in the methods herein, can include object detection techniques including, but not limited to, a 'You Only Look Once' (YOLO) unified real time object detection to detect, classify, and localize one or more objects found in the surrounding environment of the vehicle including, but not limited to, one or more traffic indicators. By utilizing YOLO object detection, the traffic indicators can be classified as, but may not be limited to, brake lights, tail lights, traffic lights, traffic signals, and/or traffic signs.

As discussed below, YOLO object detection can be completed using convolutional machine learning algorithms that can be utilized for classification of traffic indicators. The classified traffic objects can also be localized within a surrounding environment of the vehicle 102 with respect to a position and location of the vehicle 102. Upon classifying and localizing the traffic indicators, the system can extract red color components and green color components from the image and can thereby perform blob analysis based on the red color components and the green color components. The system can further determine a color of a color portion of the classified and localized traffic indicator and can thereby control the vehicle 102 based on the classification of the traffic indicator, the location of the traffic indictor, and the color of the color portion of the traffic indicator.

In the systems and methods discussed herein, the image captured by the imaging system 106 can include one or more traffic indicators having respective color portions. The traffic indicator(s) can include, but may not be limited to, a traffic light, a traffic sign, one or more brake lights, one or more turn signals, among others. In some embodiments, the traffic indicator(s) can be a signaling device positioned at road intersections, pedestrian crossings, and other locations to control flows of traffic on a road. The traffic indicator(s) can include an illuminated portion emitting a colored light. In this embodiment, the color portion of the traffic indicator(s) can include the illuminated portion.

Exemplary images and traffic indicators will now be described with reference to FIGS. 1, 2A, 2B, 2C, and 2D. FIG. 2A is an exemplary image 202 captured by the imaging system 106. The image 202 includes a forward looking view of the vehicle 102. In particular, the image 202 includes a traffic indicator 204, namely, a traffic light that can classified and localized as being located on a road (e.g., at an intersection) on which the vehicle 102 is traveling by the system 100 based on the execution of YOLO object detection. The traffic indicator 204 includes three traffic indicators 206, 208, 210 that can be classified as light signals and localized with respect to the position and location of the vehicle 102 based on the execution of YOLO object detection.

Upon the classification and localization of the light signals blob analysis can be completed to further determine that a color portion the traffic indicator 206 is emitting a red colored light and is thereby classified as a red light signal 206a, a color portion of the traffic indicator 208 is emitting a yellow colored light and is thereby classified as a yellow light signal 208a, and a color portion of the traffic indicator 210 is emitting a green colored light and is thereby classified as a green light signal 210a. It is understood that different configurations of the traffic indicators 204, 206, 208, 210 (e.g., different shapes, different number of light signals) not shown in FIG. 2A, can be implemented with the methods and systems discussed herein.

The traffic indicators 206, 208, 210, when activated, can include a color portion of the classified and localized traffic indicator 204 classified as a traffic light and/or each respective traffic indicator 206, 208, 210 classified as respective light signals of the traffic light. In FIG. 2A, the red light signal 206a is activated and is emitting a red colored light, while the yellow light signal 208a, and the green light signal 210a are deactivated. In this example, the systems and methods discussed herein can be used to classify the traffic indicator 204 as a traffic light and the traffic indicators 206, 208, 210 as the respective light signals. Additionally, the systems and methods discussed herein can be used to localize the traffic indicator 204 and the traffic indicators 206, 208, 210 with respect to the location of the vehicle 102.

The systems and methods can also be used to facilitate recognition of the red color of the color portion (e.g., the red light signal 206a) of the traffic indicator 204 (as a unit that includes the traffic indicators 206, 208, 210) and/or the specific traffic indicator 206. Further, in this example, the red light signal 206a, the yellow light signal 208b, and the green light signal 210a, when activated, can be illuminated at portions of the traffic indicator 204 that is a single body classified as a traffic light that includes the traffic indicators 206, 208, 210. In FIG. 2A, the red light signal 206a is activated, thus, the traffic indicator 206 classified as a light signal can be an illuminated portion of the traffic indicator 204 classified as a traffic light.

Figure 2B:
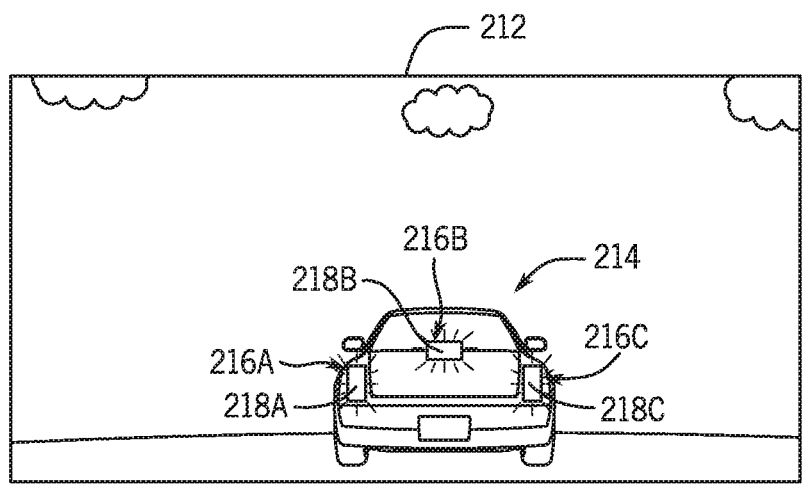
FIG. 2B illustrates an example image including traffic indicators, namely, brake lights on a target vehicle in front of a host vehicle according to an exemplary embodiment.

Referring now to FIG. 2B, another exemplary image 212 is shown. The image 212 is a forward looking view of the vehicle 102 including a target vehicle 214 that is classified and localized as being located in front of the vehicle 102. In this example, the image 212 includes a first traffic indicator 216a, a second traffic indicator 216b, and a third traffic indicator 216c, which can be classified as brake lights mounted on the target vehicle 214. Although each classified brake light is discussed as a separate traffic indicator herein, it is understood that all of the classified brake lights can be collectively classified based on object detection completed on a single traffic indicator that can include a single body in which the classified brake lights are disposed. Further, it is understood that different configurations of the first traffic indicator 216a, the second traffic indicator 216b, and the third traffic indicator 216c (e.g., different shapes, different number of light signals) not shown in FIG. 2B, can be implemented with the methods and systems discussed.

The first traffic indicator 216a can be classified as a first light signal 218a that can emit a colored light (e.g., red, yellow) in conjunction with a braking system (not shown) and/or a turn signal system (not shown) of a classified and localized target vehicle 214. Similarly, the second traffic indicator 216b can be classified as a second light signal 218b that can be localized with respect to the position of the vehicle 102 that can emit a colored light (e.g., red, yellow) in conjunction with a braking system and/or a turn signal system of the classified and localized target vehicle 214. Further, the third traffic indicator 216c can be classified as a third light signal 218c that can emit a colored light (e.g., red, yellow) in conjunction with a braking system and/or a turn signal system of the classified and localized target vehicle 214.

The first light signal 218a, the second light signal 218b, and the third light signal 218c, when activated (e.g., when emitting a colored light) can each be a color portion of the respective traffic indicators 216a, 216b, 216c. In some embodiments, the first light signal 218a, the second light signal 218b, and the third light signal 218c, when activated, can be illuminated at portions of the respective traffic indicators 216a, 216b, 216c. In FIG. 2B, the first light signal 218a, the second light signal 218b, and the third light signal 218c are shown in an activated state, each emitting a red colored light. Thus, in some embodiments, the first light signal 218a, the second light signal 218b, and the third light signal 218c are considered as illuminated portions of the respective classified traffic indicators. As discussed below, upon classifying and localizing the traffic indicators, the system 100 can complete further analysis of the illuminated portions of the respective traffic indicators to thereby control vehicle systems 108 of the vehicle 102 based on the color of the illuminated portions of the traffic indicators.

Figure 2C:
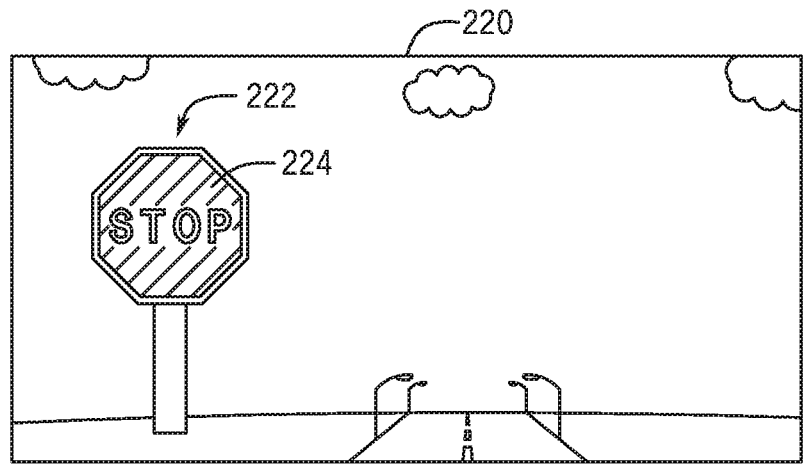
FIG. 2C illustrates an example image including a traffic indicator, namely, a traffic sign according to an exemplary embodiment.

Referring now to FIG. 2C, another exemplary image 220 is shown. The image 220 is a forward looking view of the vehicle 102 including a traffic indicator 222. Specifically, the traffic indicator 222 in FIG. 2C can be classified as a stop sign that is localized with respect to the vehicle 102 (e.g., ahead and to the left of the vehicle 102), however, it is understood that other types of signs and other configurations different than those shown in FIG. 2C can be classified and localized using the YOLO object detection, as disclosed in more detail below. The traffic indicator 222 includes a color portion 224. Here, the color portion is a red color. The color portion 224 is not an illuminated portion in FIG. 2C, however, it is understood that the color portion 224 can be an illuminated portion in other embodiments.

Figure 2D:
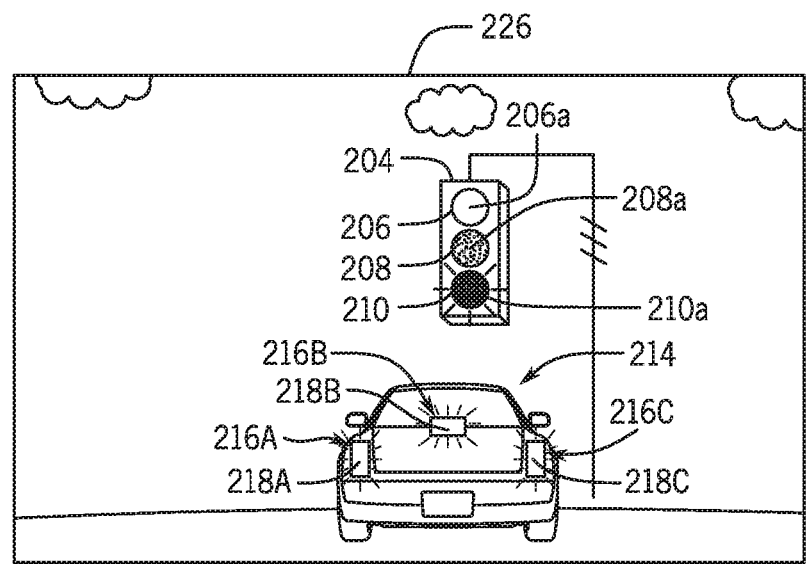
FIG. 2D illustrates an example image including traffic indicators, namely, a traffic light, light signals of the traffic light, and brake lights on a target vehicle according to an exemplary embodiment.

A further exemplary image 226 is shown in FIG. 2D. FIG. 2D illustrates a driving scenario with the traffic indicator 204 as shown in FIG. 2A and the first traffic indicator 216a, the second traffic indicator 216b, and the third traffic indicator 216c shown in FIG. 2B. For simplicity, like numerals in FIGS. 2A, 2B, and 2D represent like components. In the example shown in FIG. 2D, and in contrast to the example shown in FIG. 2A, the green light signal 210a is activated (i.e., emitting a green colored light) and the red light signal 206a is deactivated. With respect to the classified and localized target vehicle 214, the first light signal 218a, the second light signal 218b, and the third light signal 218c are shown in an activated state, each emitting a red colored light. Accordingly, in FIG. 2D, the image 226 includes a green color portion (i.e., the green light signal 210a) and a red color portion (i.e., the first light signal 218a, the second light signal 218b, and the third light signal 218c). The images shown in FIGS. 2A, 2B, 2C, and 2D will be used as examples herein for recognition of red color and green color.

Figure 2E:
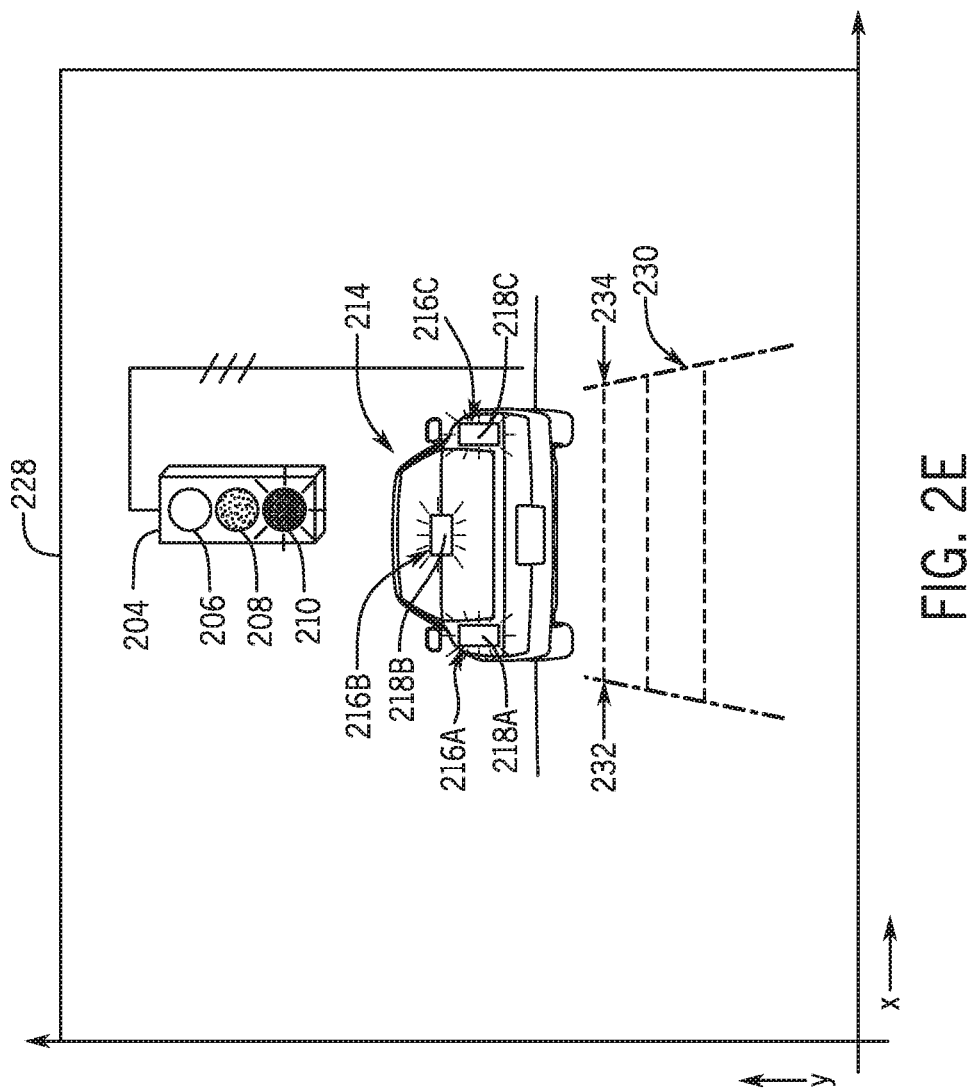
FIG. 2E illustrates the example image of FIG. 2D including traffic indicator classification according to an exemplary embodiment.

A further exemplary image 228 is shown in FIG. 2E, which is similar to the image 226, but with a detailed illustration of traffic indicator classification according to one embodiment. The image 228 is shown according to an x-axis and y-axis coordinate system, although other coordinate systems can be implemented In FIG. 2E, the target vehicle 214 is travelling on a road lane 230. In one embodiment, the imaging system 106 and/or the vehicle systems 108 (e.g., lane keeping assist system) can identify the lane lines of the road lane 230. For example, in FIG. 2E, the road lane 230 includes a left lane line 232 and a right lane line 234. In another embodiment, YOLO object detection can be executed to classify and localize the road lane 230.

As discussed in more detail below, the system 100 can utilize YOLO object detection to classify and localize one or more objects including one or more of the traffic indicators. For example, with respect to FIG. 2A, YOLO object detection can be utilized to classify the traffic indicator 204 as a traffic light and further classify the traffic indicators 206, 208, 210 of the classified traffic light as light signals. YOLO object detection can also be utilized to localize the traffic indicators 204, 206, 208, 210 with respect to the position and location of the vehicle 102. With respect to FIG. 2B, YOLO object detection can also be utilized to classify the target vehicle 214 and localize the target vehicle as being located directly in front of the vehicle 102. Furthermore, the traffic indicators 216A, 216B can be classified as brake lights that are localized with respect to the vehicle 102.

In an alternate embodiment if more than one traffic indicator (e.g., more than one anomaly) is detected within a horizontal plane of the x-axis and the more than one traffic indicator is detected inside the lane boundaries (e.g., the left lane line 232 and the right lane line 234), the system 100 can independently classify the traffic indicators as brake lights. On the other hand, if a traffic indicators are detected outside of the lane boundaries (e.g., the left lane line 232 and the right lane line 234), the system can classify the traffic indicators as a traffic light and/or a traffic sign. In some embodiments, the system 100 can also classify the traffic indicators based on the shapes of the traffic indicators. It is to be appreciated that the system 100 can utilize various types of object detection and classification techniques to classify and/or localize the traffic indicators located within a surrounding environment of the vehicle 102 as captured within one or more images/videos by the imaging system 106 of the vehicle 102.

Referring again to FIG. 1, the VCD 104 can also use the vehicle systems 108 to obtain vehicle information about the vehicle 102. As mentioned above, the vehicle systems 108 can include, but are not limited to, any automatic or manual systems that can be used to enhance the vehicle, driving, and/or safety. It is understood that the vehicle systems 108 can include various vehicle sensors (not shown) that sense and measure different stimuli (e.g., a signal, a property, a measurement, a quantity) associated with the vehicle 102 and/or a particular vehicle system 108. For example, other vehicle sensors can include cameras mounted to the interior or exterior of the vehicle 102 (e.g., as part of the imaging system 106), radar and laser sensors mounted to the exterior of the vehicle 102, external cameras, radar and laser sensors (e.g., on other vehicles in a vehicle-to-vehicle network, street cameras, surveillance cameras). The sensors can be any type of sensor, for example, acoustic, electric, environmental, optical, imaging, light, pressure, force, thermal, temperature, proximity, among others.

The vehicle systems 108 can include Advanced Driver Assistance Systems (ADAS), for example, an adaptive cruise control system, a blind spot monitoring system, a collision mitigation system, a lane departure warning system, among others. In some embodiments, one or more of the vehicle systems 108 can include vehicle sensors for detecting objects surrounding the vehicle 102. For example, proximity sensors, radar sensors, laser sensors, LIDAR sensors, and other optical sensors, can be used to detect objects within the surrounding environment of the vehicle 102. In some embodiments, these sensors can be used in conjunction with or in addition to YOLO object detection to localize the objects with respect to the vehicle 102.

In some embodiments, the VCD 104 can obtain and communicate data representing the stimulus from the vehicle sensors. This data can include and/or be processed into vehicle data. Vehicle data includes data related to the vehicle 102 and/or the vehicle systems 108. Specifically, vehicle data can include conditions, states, statuses, behaviors associated with vehicle 102 and/or the vehicle system 108, and information about the external environment of the vehicle 102 (e.g., other vehicles, pedestrians, objects, road conditions, weather conditions). Exemplary vehicle data includes, but is not limited to, acceleration information, velocity information, steering information, lane departure information, blind spot monitoring information, braking information, collision warning information, navigation information, collision mitigation information and cruise control information.

Additionally, the vehicle systems 108 can also provide data about a driver and/or vehicle occupants (not shown) in the vehicle 102. For example, the vehicle systems 108 can include automatic or manual systems and sensors that monitor and provide information related to a driver, for example, heat rate, respiratory rate, eye movements, head movements, body movements, hand postures, hand placement, body posture, and gesture recognition, among others.

Referring again to the VCD 104 of FIG. 1, the VCD 104 can generally include a processor 110, a memory 112, a disk 114, and a communication interface 116, which are each operably connected for computer communication via a bus 118 and/or other wired and wireless technologies. The processor 110 can include logic circuitry (not shown) with hardware, firmware, and software architecture frameworks for facilitating hybrid speech data processing with the components of the system 100. Thus, in some embodiments, the processor 110 can store application frameworks, kernels, libraries, drivers, application program interfaces, among others, to execute and control hardware and functions discussed herein.

In some embodiments, the memory 112 and/or the disk 114 can store similar components as the processor 110 for execution by the processor 110. The communication interface 116 can include software and hardware to facilitate data input and output between the components of the VCD 104 and other components of the system 100. Specifically, the communication interface 116 can include network interface controllers (not shown) and other hardware and software that manages and/or monitors connections and controls bi-directional data transfer between the communication interface 116 and other components of the system 100.

In an exemplary embodiment, the communication interface 116 of the vehicle 102 can be configured to communicate externally to an externally hosted server infrastructure 120. The externally hosted server infrastructure 120 can host a neural network 122 that can be accessed by the vehicle 102 through the communication interface 116. In particular, the neural network 122 can be accessed to provide and/or obtain data to execute YOLO object detection to detect, classify, and localize objects including traffic indicators located within the surrounding environment of the vehicle 102. In some configurations, in addition to being hosted on the externally hosted server infrastructure 120, the neural network 122 or specific subsets (not shown) of the neural network 122 can also be hosted and/or executed by the vehicle 102.

In one or more embodiments, the externally hosted server infrastructure 120 can host one or more machine learning processors that can execute various types of machine learning methods. It is to be appreciated that this disclosure can apply to the neural network 122 being configured in various formats. However, for purposes of simplicity, this disclosure is focused on the neural network 122 being configured as a convolutional neural network (CNN) that is configured to analyze visual imagery, including but not limited to one or more images/video (hereinafter referred to as images) provided by the imaging system 106 of the vehicle 102.

In an exemplary embodiment, the neural network 122 can process a programming model which enables computer based learning and output that is based on one or more forms of data that are provided to the neural network 122 and/or learned by the neural network 122. In one embodiment, the neural network 122 can include a neural network processing unit 124 and a neural network machine learning database 126. The neural network processing unit 124 can be configured to utilize one or more types of machine learning methods and/or deep learning methods to provide artificial intelligence capabilities that can be utilized to execute (process and compute) a YOLO object detection algorithm to provide various functions, including, but not limited to, object detection, object classification, object localization, feature recognition, computer vision, speed recognition, machine translation, autonomous driving commands, and the like.

In one embodiment, the neural network machine learning database 126 can store an object detection dataset that can be accessed and analyzed to classify and localize one or more objects including traffic indicators located within the surrounding environment of the vehicle 102. In one exemplary configuration, the neural network machine learning database 126 can be trained on one or more datasets (e.g., PASCAL VOC dataset) that can be utilized to detect, classify, and localize objects from one or more images captured and provided by the imaging system 106. For example, the neural network machine learning database 126 can be trained for an n number of epochs on standardized image data sets for object class recognition and can enable comparison and evaluation of objects using different methods including YOLO object detection.

With respect to the configuration of the neural network 122, in one configuration, initial convolutional layers of the neural network 122 (configured as CNN) can extract features from images/video as fully connected layers of the neural network 122 that can predict output probabilities and coordinates. In one exemplary embodiment, the neural network 122 can include a plurality of convolutional layers that are pre-trained on an ImageNet 1000-class completion dataset. In one exemplary configuration, the neural network 122 can include twenty-four convolutional layers followed by two fully connected layers (e.g., using 1×1 reduction layers followed by 3×3 convolutional layers). In one embodiment, the neural network 122 can be configured to process and compute the YOLO object detection algorithm based on a final layer that is configured to predict class probabilities and bounding box coordinates.

The neural network 122 can be configured to access the neural network machine learning database 126 to predict an n number of bounding boxes per image and class probabilities for each bounding box based on analysis of each of the images provided by the imaging system 106 using one or more datasets. Using YOLO object detection, the neural network 122 can compute grid cells for each image and can determine n number of bounding boxes for each grid cell to enforce spatial diversity in the bounding box predictions.

As discussed in more detail below, the YOLO object detection algorithm can be processed and computed to provide real-time object detection on one or more objects located within the surrounding environment of the vehicle 102 to thereby classify and localize the one or more objects that can include traffic indicators. In one configuration, the imaging system 106 can be configured to provide image data associated with the image(s) captured and provided by the imaging system 106 to the neural network 122 to be processed in real-time.

The YOLO object detection algorithm can be executed by the neural network 122 to provide a unified model for object detection that can provide robust object detection that analyzes each image (e.g., color video frame) in a single pass (rather than utilizing numerous passes via a sliding window approach) to thereby efficiently classify and localize one or more objects within the surrounding environment of the vehicle 102 that can include one or more traffic indicators. The YOLO object detection can be utilized to localize and track the one or more objects based on the receipt of a plurality of images (e.g., video for a predetermined period of time) as they move around or change locations with respect to a location of the vehicle 102 based on the movement of the vehicle 102.

The system 100 of FIG. 1 will now be described in more detail with reference to FIG. 3 and a method 300 for vehicle control based on traffic indicator classification, localization, and color detection according to an exemplary embodiment. Further, method 300 will be described with respect to the illustrative examples shown in FIGS. 2A, 2B, 2C, 2D, 2E, and 2F. For simplicity, the elements and configuration of the components of FIGS. 1, 2A, 2B, 2C, and 2F will be used throughout the description. At block 302, the method 300 includes receiving an image from an imaging system. For example, the processor 110 can receive an image (e.g., the image 202, the image 212, the image 220, and the image 226, a frame of a video) from the imaging system 106. As discussed above with FIGS. 2A, 2B, 2C, and 2D, the image can include a traffic indicator having a color portion. For example, in FIG. 2A the image 202 includes the traffic indicator 204. The red light signal 206a can be a color portion of the traffic indicator 204 and the traffic indicator 206 (included as part of the traffic indicator 204) as the red light signal 206a is emitting a red colored light in the example shown in the image 202. This is in contrast to the yellow light signal 208a and the green light signal 210a, which are not activated (i.e., not emitting a colored light).

The method 300 can proceed to block 304, wherein the method 300 can include executing the YOLO object detection algorithm to classify and localize a traffic indicator. It is understood that other types of algorithms for object detection can also be implemented. Further, it is understood that various types of image processing can be performed at block 304, for example image filtering techniques, such as morphological operations, which will be described in more detail herein.

Figure 4:
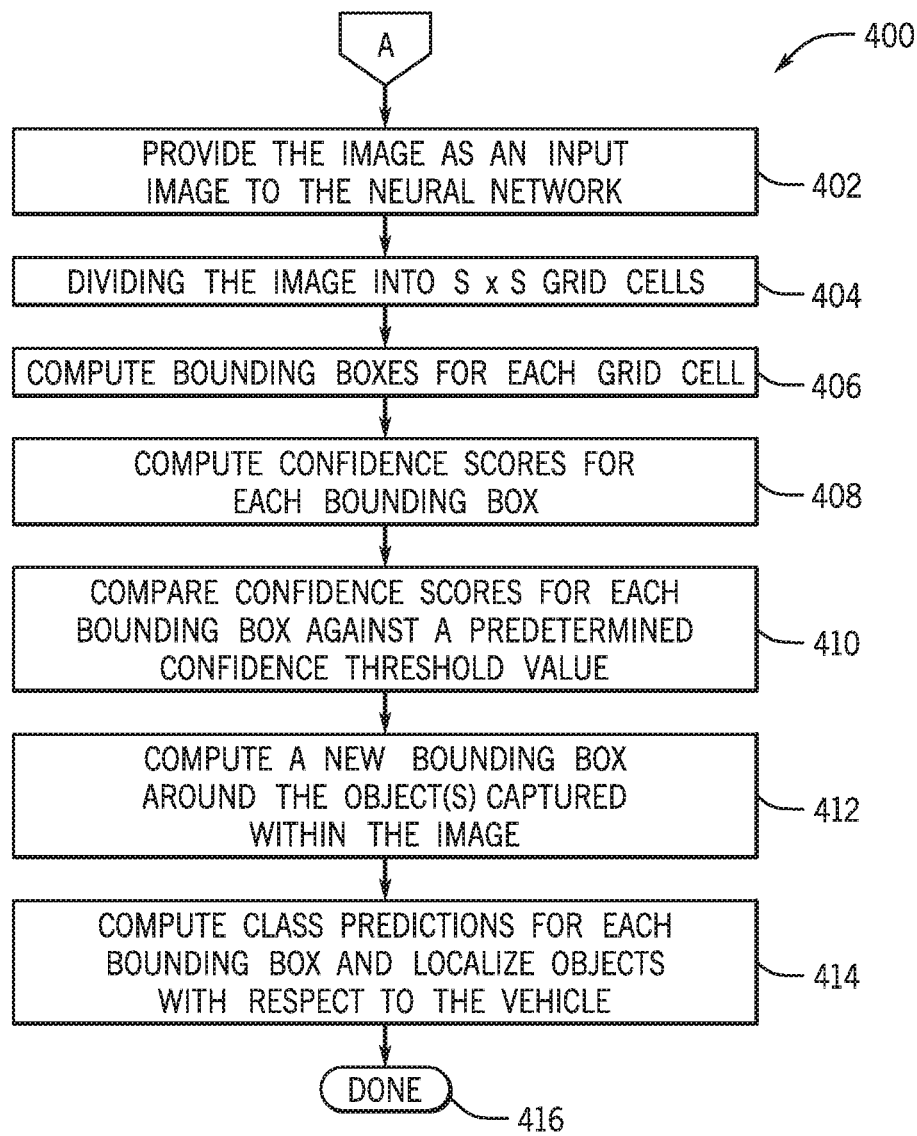
FIG. 4 is flow chart of a method for executing "You Only Look Once" (YOLO) object detection to classify and localize a traffic indicator(s) according to an exemplary embodiment.

The YOLO object detection algorithm will now be described in more detail with respect to FIGS. 1, 2F, and 4. With particular reference to FIG. 4, a method 400 for executing YOLO object detection to classify and localize a traffic indicator(s) according to an exemplary embodiment, the method 400 can begin at block 402. At block 402 the method 400 can include providing the image as an input image to the neural network 122. In an exemplary embodiment, image data pertaining to the image received from the imaging system 106 can be communicated to the neural network 122. The neural network processing unit 124 can be configured to receive the image data for further processing. As an illustrative example, with reference to FIG. 2D, the image 216 can be configured 416×416 pixel image that can be provided to the neural network 122 to complete YOLO object detection in a single pass.

The method 400 can proceed to block 404, wherein the method 400 can include dividing the image into an S×S grid. The neural network processing unit 124 can be configured to process the image data and divide the image into a grid. The grid can include an S×S number of cells that each can be further processed to predict bounding boxes, as discussed below. As an illustrative example, the neural network processing unit 124 can process the image into a grid of 13×13 cells. With reference to FIG. 2D, the neural network processing unit 124 processes the image 216 into 169 total grid cells of the 13×13 grid.

The method 400 can proceed to block 406, wherein the method 400 can include computing bounding boxes for each grid cell. In an exemplary embodiment, upon processing the grid cells based on dividing of the image into the S×S grid, the neural network processing unit 124 can be configured to compute and predict bounding boxes for each of the grids of the grid cells. In particular, the neural network processing unit 124 can predict $\beta$ bounding boxes for each grid cell. As an illustrative example, if the neural network processing unit 124 divides the image into a 13×13 grid and processes 169 grid cells, the neural network processing unit 124 can compute five bounding boxes for each of the 169 grid cells. Accordingly, the neural network processing unit 124 can initially compute 845 bounding boxes that can be processed with respect to the image 226, shown in FIG. 2D. The 845 bounding boxes can include one or more portions of the traffic indicators 204, the target vehicle 214, traffic indicators 216A, 216B, among other objects included within the image 226.

The method 400 can proceed to block 408, wherein the method 400 can include computing confidence scores for each bounding box. In one embodiment, upon computing the bounding boxes for each grid cell, the neural network processing unit 124 can compute confidence scores for each predicted bounding box. In one configuration, the neural network processing unit 124 can analyze each of the bounding boxes to determine if a portion of one or more objects is included within the respective bounding boxes included within each of the computed grid cells of the colored image. The neural network processing unit 124 can determine one or more bounding boxes of each grid cell that do not contain any portions of one or more of the objects captured within the image. In other words, the neural network processing unit 124 can determine the bounding boxes that do not include one or more portions of one or more objects that can include traffic indicators within the image.

In an exemplary embodiment, upon determining the bounding boxes of each grid cell that do not include any portions of one or more objects, including the traffic indicator(s) captured within the image, the neural network processing unit 124 can assign a null value confidence score (e.g., confidence score of zero) that indicates that there is no confidence score associated with the respective bounding boxes. The neural network processing unit 124 can thereafter remove the bounding boxes with the null value confidence score so that they are no longer analyzed with respect to the classification and localization of the one or more objects including traffic indicators within the image.

In one embodiment, upon removing the respective bounding boxes that are assigned the null value confidence score, the neural network processing unit 124 can thereafter analyze the remaining bounding boxes within each of the grid cells of the image to compute respective confidence scores. The confidence scores can be utilized to determine a confidence value assigned by the neural network 122 that each particular bounding box encloses an object. In an exemplary embodiment, the neural network processing unit 124 can make a plurality of predictions for each of the remaining bounding boxes that can include, but is not limited to, x y value predictions that represent the center of each bounding box relative to the bounds of each grid cell in which the bounding box is computed. Additionally, the predictions can include w, h values that represent the width and height of each (remaining) computed bounding box relative to the whole image. Further, the predictions can include a confidence prediction that represents an intersection of union (IOU) between the predicted bounding box and any ground truth box. The confidence can be defined as Pr(Object) *$IOU^{truth\ pred}$, which indicates the confidence score being equal to the IOU between each predicted bounding box and the ground truth.

The method 400 can proceed to block 410, wherein the method 400 can include comparing confidence scores for each bounding box against a predetermined confidence threshold value. In one embodiment, the neural network processing unit 124 can utilize an n confidence threshold value to be utilized to further determine bounding boxes that include one or more objects. The neural network processing unit 124 can thereafter compare the confidence scores predicted for each of the (remaining) bounding boxes that include one or more portions of one or more objects against the predetermined confidence threshold value.

Upon comparing the confidence scores against the predetermined confidence threshold value, the neural network processing unit 124 can determine one or more of the bounding boxes that include a confidence score below the predetermined confidence threshold value. Upon determining the one or more bounding boxes that include a confidence score below the predetermined confidence threshold value, the neural network processing unit 124 can be configured to remove the respective bounding boxes that include the confidence score below the predetermined confidence threshold value.

As an illustrative example, the neural network processing unit 124 can compare the confidence scores for each bounding box against a predetermined confidence score value of 0.3 (CS≥30%). Accordingly, the neural network processing unit 124 can remove the bounding boxes that include a confidence score that is below 0.3 (CS<30%). Additionally, the neural network can retain the bounding boxes included within the grid cells of the image that include a confidence score that is equal to or above 0.3(CS≥30%).

The method 400 can proceed to block 412, wherein the method 400 can include computing a new bounding box(es) around object(s) captured within the image. In one embodiment, upon removing the one or more bounding boxes that include a confidence score below the predetermined confidence threshold value, the neural network processing unit 124 can compute new bounding boxes that encompass one or more of the objects that can include traffic indicators. The neural network processing unit 124 can compute new bounding boxes that include areas of the image with grid cells that include the bounding boxes that encompass one or more of the objects (e.g., the grid cells that included the bounding boxes computed at block 406 with a confidence score equal to or greater than the predetermined confidence score, as computed at block 408).

Figure 2F:
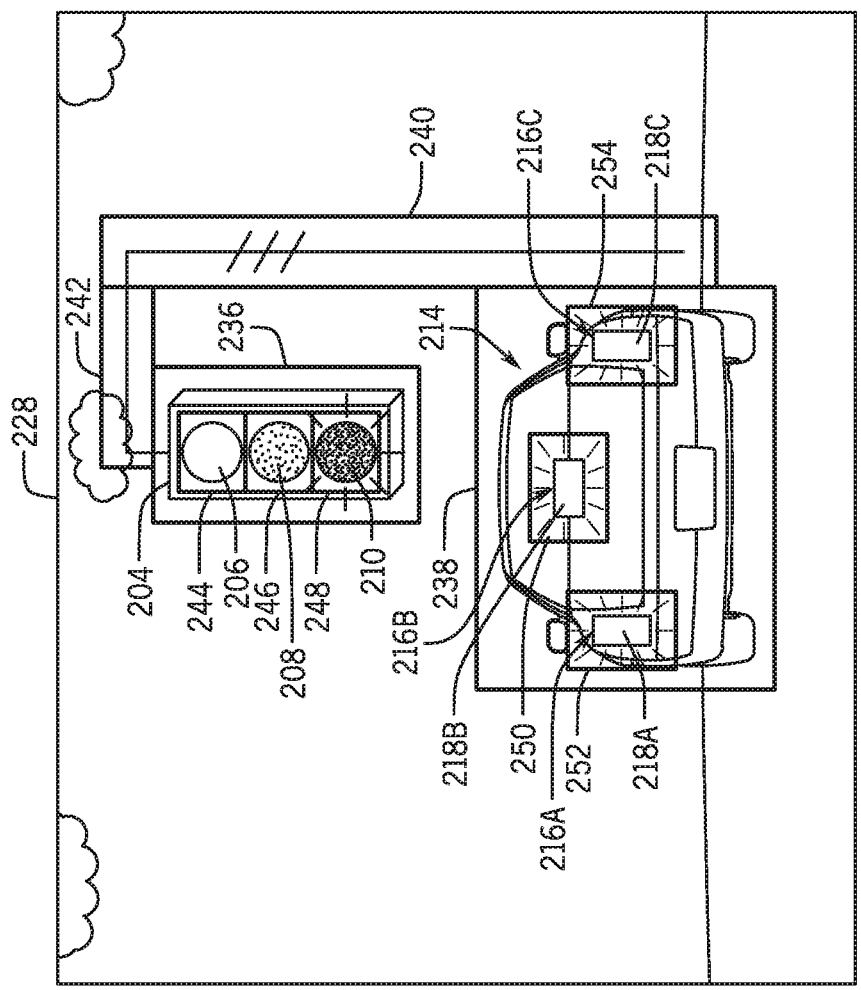
FIG. 2F illustrates an example image of FIG. 2D including newly computed bounding boxes around the traffic indicators.

Accordingly, as illustrated in FIG. 2F, the neural network processing unit 124 can compute bounding boxes 236-254 around the objects captured within the image 228, which can include one or more traffic indicators. In particular, the newly computed bounding boxes 236-254 can encompass the areas of the image 226 that include grid cells that include one or more of the objects (that were encompassed within the originally computed bounding boxes computed at block 406) that can include the target vehicle 214, the first traffic indicator 216a, the second traffic indicator 216b, the third traffic indicator 216c, the traffic indicator 204, and/or traffic indicators 206, 208, 210 that are included as part of the traffic indicator 204.

The method 400 can proceed to block 414, wherein the method 400 can include completing class predictions for each bounding box and localizing objects with respect to the vehicle 102. In one embodiment, upon computing one or more new bounding boxes around one or more objects captured within the image, the neural network processing unit 124 can determine a set of class probabilities Pr(Class$_i$ I Object) for each grid cell that includes the one or more newly computed bounding boxes. The neural network processing unit 124 can thereafter multiply the conditional class probabilities and the individual box confidence scores to determine class-specific confidence scores for each bounding box. The class-specific confidence score for each class can be defined as: Pr(Class$_i$ I Object)*Pr(Object) *$IOU^{truth\ pred.}$=Pr(Class$_i$)*$IOU^{truth\ pred.}$ Upon determining the class-specific confidence scores for each bounding box, the neural network processing unit 124 can access the neural network machine learning database 126 to evaluate the class-specific confidence scores on one or more datasets that can be utilized predict detections, classifications, and localizations of the one or more objects captured within the image. The neural network processing unit 124 can thereafter classify each of the one or more objects including one or more traffic indicators captured within the image. Additionally, the neural network processing unit 124 can provide localization data with locational coordinates of the one or more objects including one or more traffic indicators captured within the image with respect to a location and position of the vehicle 102. As discussed above, the traffic indicators can be classified as, but may not be limited to, brake lights, tail lights, traffic lights, traffic signals, and/or traffic signs that are captured within the image and included within the newly computed bounding boxes (computed at block 412). In one embodiment, the neural network processing unit 124 can output the predictions as an encoded S×S×(B*5+C) tensor. The neural network processing unit 124 can thereafter communicate respective YOLO data to the processor 110 of the vehicle 102.

The YOLO object detection can accordingly be utilized to localize and track one or more objects that include the traffic indicators located within the surrounding environment of the vehicle 102 based on the analysis of a plurality of images (e.g., video) as the objects move around or change locations based on the movement of the vehicle 102 with respect to a location of the vehicle 102. As discussed below, based on the classification and localization data communicated by the neural network 122 to the processor 110, the VCD 104 of the vehicle 102 can control one or more of the vehicle systems 108 of the vehicle 102 based on the classification, the location, and a color of the color portion of a traffic indicator.

In one embodiment, upon classifying and localizing the one or more objects captured within the image, the image, as originally provided by the imaging system 106, can be further processed using an RGB color model to recognize a color of the color portion of each classified and localized traffic indicator, namely, a red color and a green color. Thus, each pixel in the image can be described by intensities for red, green, and blue. Specifically, each pixel in the image can be defined by a red-scale value, a green-scale value, and a blue-scale value. In the embodiments discussed herein, a grayscale intensity value of each pixel of the image can be used in the image processing.

Referring again to FIG. 3, at block 306, the method 300 can optionally include generating a grayscale image of the image. More specifically, the processor 110 can convert and/or generate the image, as originally provided by the imaging system 106, to a grayscale image to determine the grayscale intensity value of each pixel in the image. Thus, each pixel in the grayscale image has a grayscale intensity value, which can be calculated based on the red-scale, green-scale, and blue-scale values of the pixel in the image.

The grayscale intensity value can be used to extract red color components and green color components from the image. Accordingly, at block 308, the method 300 can include extracting red color components from the image by subtracting a grayscale intensity value of each pixel in the image from a red-scale value of each pixel in the image. In one embodiment, the processor 110 can extract the red color components from the image by subtracting the grayscale intensity value of each pixel in the image from the respective red-scale values of each pixel in the image. Similarly, at block 310, the method 300 can include extracting green color components from the image by subtracting the grayscale intensity value of each pixel in the image from a green-scale value of each pixel in the image. Said differently, the processor 110 can extract green color components from the image by subtracting the grayscale intensity value of each pixel in the image from the respective green-scale value of each pixel in the image.

Red colors and green colors can be recognized using further image processing based on the extracted red components and the extracted green components. Thus, at block 312, the method 300 can include performing Binary Large Object (blob) analysis based on the red color components and the green color components. In one embodiment, the processor 110 performs blob analysis based on the red color components and the green color components using connected component algorithms, for example, algorithms based on 4-connectivity or 8-connectivity. It is understood that other types of algorithms for blob analysis can also be implemented. Further, it is understood that other types of image processing can be performed at block 312, for example image filtering techniques, for example, morphological operations, which will be described in more detail herein.

Blob analysis will now be described in more detail with respect to FIGS. 1, 5A, 5B, and 5C. FIG. 5A is a flow chart of a method 500 for performing blob analysis for red color according to an exemplary embodiment. At block 504, the method 500 includes converting the red color components to binary components. Said differently, the red color components are converted into a binary image. In one embodiment, which will be described in further detail with FIG. 5C, the red color components are converted in to a binary image using image binarization using adaptive thresholding based on light intensity.

Based on the connected component algorithms discussed above, at block 506, the processor 110 identifies red color blobs based on the red color components. At block 508, a size of each of the red color blobs identified at block 506 is compared to a predetermined threshold. A size of each of the red color blob can be a geometric parameter, for example, a pixel number, a number of connected pixels, a height or a width of a blob, among others. By comparing the size of each of the red color blobs to a predetermined threshold, blobs are filtered out that are not likely to be a color portion from a traffic indicator (e.g., not a red light from a traffic light or a red light from a brake light). If the determination at block 508 is NO, a red blob has not been detected in the image and a first output value (e.g., stored at the memory 112 and/or disk 114) can be set to false (e.g., 0) at block 510. Otherwise, if the determination at block 508 is YES, a red blob has been detected in the image and the first output value (e.g., stored at the memory 112 and/or disk 114) can be set to true (e.g., 1) at block 512. Thus, upon detecting a red blob, the processor 110 can set the first output value to true. At block 514, the method 500 can return to block 312 of FIG. 3.

In another embodiment, if the determination at block 508 is YES, the blob can be verified with image segmentation. Referring now to FIG. 5C, a method 516 for image segmentation is shown according to an exemplary embodiment. It is understood that in some embodiments, blocks 518 and 520 can be processed in parallel with blocks 504, 506, and 508 of FIG. 5A. At block 518, the method 516 includes performing image segmentation on the red color components using adaptive thresholding (e.g., light intensity). Thus, in one some embodiments, the red color components are converted to a binary image using segmentation based on light intensity. Additionally, at block 518, the method 516 includes performing edge detection on the binary image.

Based on the edge detection, at block 520, closed shapes are identified and filled using morphological operations. In an alternate embodiment, the closed shapes can be identified based on the YOLO data communicated by the neural network 122 based on the execution of the YOLO object detection, as discussed above with respect to FIG. 4. The closed shapes, in some embodiments, can be identified as having a closed shape of a classified light indicator (e.g., traffic light, brake lights). The resulting segmented binary image can be based on the light intensity segmentation that contains the identified closed shapes with light radiating areas in the binary image.

The identified closed shapes are then compared to the blobs identified in method 500. Specifically, it is determined if the identified closed shape overlaps the identified blob. Said differently, it is determined if the identified closed shapes in the segmented binary image share a common area with the identified blobs. If the determination at block 522 is NO, the method 516 can proceed to block 510 of FIG. 5A, and the first output value can be set to false at block 510. Otherwise, if the determination at block 522 is YES, the method 516 can proceed to block 512 of FIG. 5A, and the processor 110 can set the first output value to true.

Figure 5B:
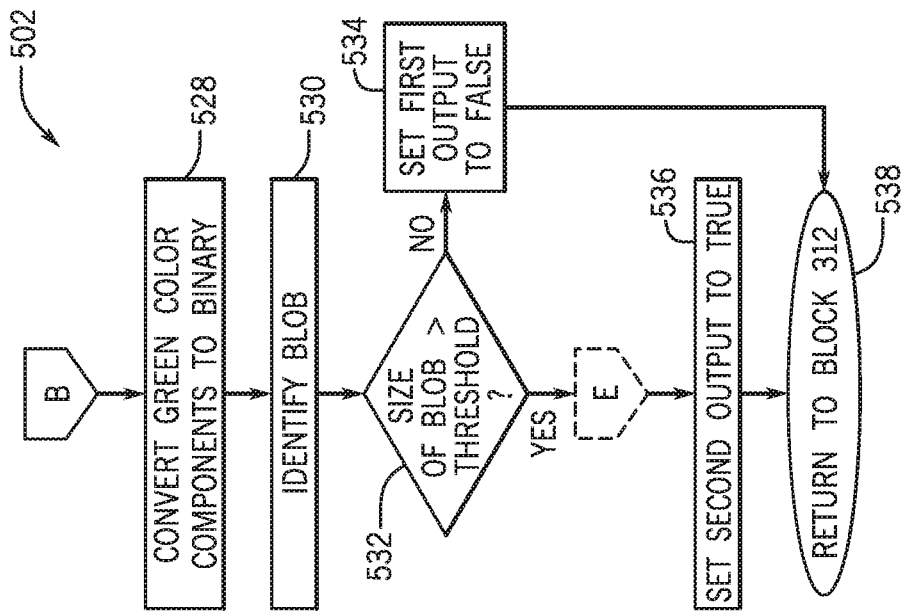
FIG. 5B is a flow chart of a method for performing blob analysis for green color according to an exemplary embodiment.
Figure 5A:
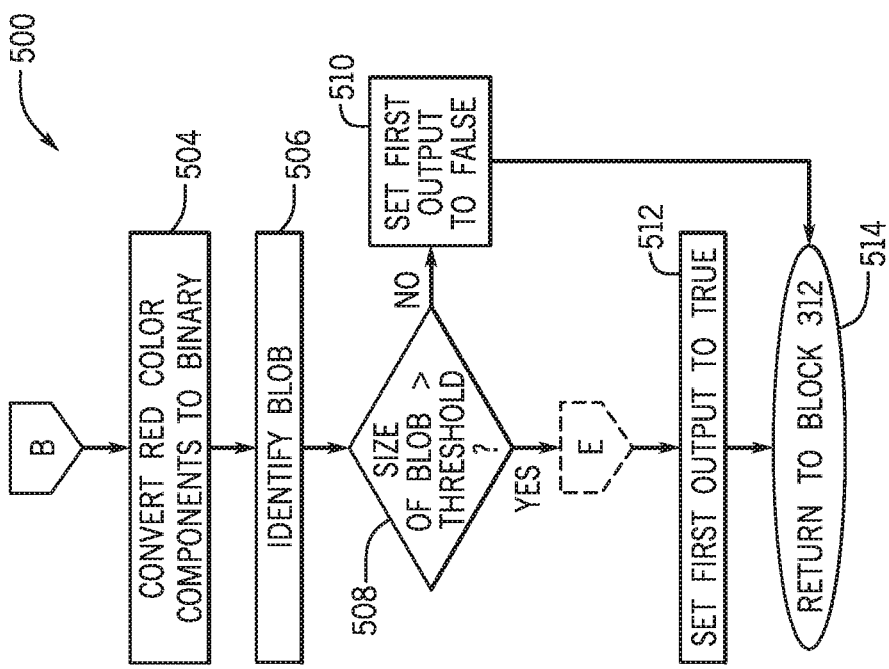
FIG. 5A is a flow chart of a method for performing "Binary Large Object" (blob) analysis for red color according to an exemplary embodiment.
Figure 5C:
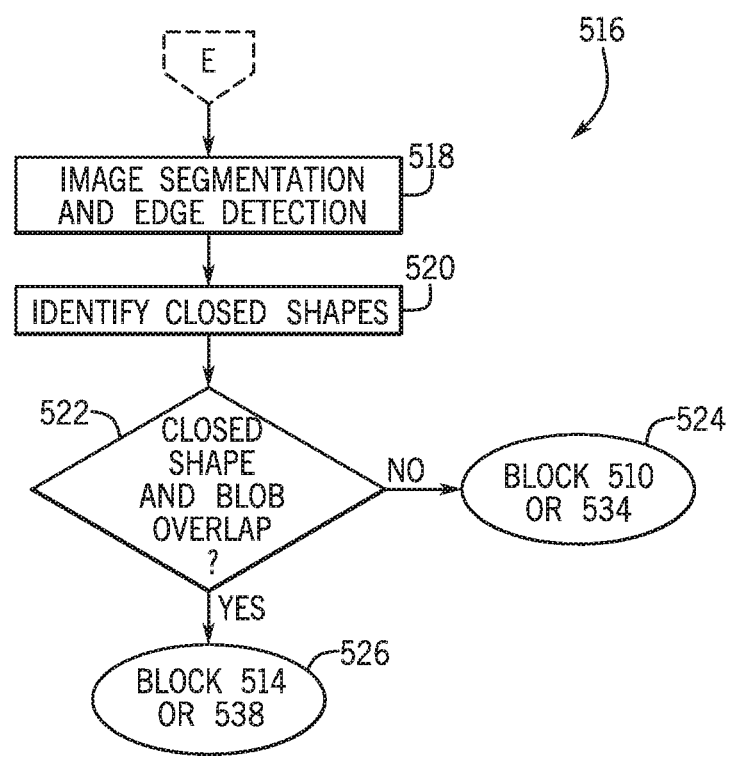
FIG. 5C is a flow chart of a method for performing image segmentation according to an exemplary embodiment.

Referring now to FIG. 5B, a flow chart of a method 502 for performing blob analysis for green color according to an exemplary embodiment is shown. It is understood that the processor 110 can perform blob analysis for red color as described in FIG. 5A in parallel with blob analysis for green color as described here with FIG. 5B. At block 528, the method 502 can include converting the green color components to binary components. Based on the connected component algorithms discussed above, at block 530, the processor 110 can identify green color blobs based on the green color components. At block 532, a size of each of the green color blobs identified at block 530 are compared to a predetermined threshold. A size of each of the red color blob can be a geometric parameter, for example, a pixel number, a number of connected pixels, a height or a width of a blob, among others. By comparing the size of each of the green color blobs to a predetermined threshold, blobs are filtered out that are not likely to be a color portion from a traffic indicator (e.g., not a green light from a traffic light). If the determination at block 532 is NO, a green color has not been detected in the image and a second output value (e.g., stored at the memory 112 and/or disk 114) can be set to false (e.g., 0) at block 534. Otherwise, if the determination at block 532 is YES, a green blob has been detected in the image and the second output value (e.g., stored at the memory 112 and/or disk 114) can be set to true (e.g., 1) at block 536. Thus, upon detecting a green blob, the processor 110 can set the second output value to true. At block 536, the method 500 can return to block 312 of FIG. 3.

In another embodiment, if the determination at block 532 is YES, the blob can be verified with image segmentation, as discussed above with the method 516 shown in FIG. 5C. Referring again to FIG. 5C, it is understood that in some embodiments, blocks 518 and 520 can be processed in parallel with blocks 528, 530, and 532 of FIG. 5B. At block 518, the method 516 can include performing image segmentation on the green color components using adaptive thresholding (e.g., light intensity). Thus, in one some embodiments, the green color components are converted to a binary image using segmentation based on light intensity. Additionally, at block 518, the method 516 can include performing edge detection on the binary image.

Based on the edge detection, at block 520, closed shapes are identified and filled using morphological operations. In an alternate embodiment, the closed shapes can be identified based on the YOLO data communicated by the neural network 122 based on the execution of the YOLO object detection, as discussed above with respect to FIG. 4. The closed shapes, in some embodiments, can be identified as having a closed shape of a classified light indicator (e.g., traffic light, brake lights). The resulting segmented binary image based on the light intensity segmentation contains only identified closed shapes with light emitting areas in the binary image. The identified closed shapes are then compared to the blobs identified in method 500. Specifically, it is determined if the identified closed shape overlaps the identified blob. Said differently, it is determined If the identified closed shapes in the segmented binary image share a common area with the identified blobs. If the determination at block 522 is NO, the method 516 proceeds to block 534 of FIG. 5B, and the first output value can be set to false at block 534. Otherwise, if the determination at block 522 is YES, the method 516 proceeds to block 536 of FIG. 5B, and the processor 110 can set the first output value to true.

Referring again to FIG. 3, the method 300 can proceed to block 314, wherein the method 300 can include determining, based on the blob analysis, a color of the color portion of the traffic indicator. In particular, the output values (i.e., the first output value and the second output value) are analyzed by the processor 110 to determine the color of the color portion in the image. It is understood that more than one color in the image can be determined and that more than one color portion and/or traffic indicator can be included in the image.

Figure 6:
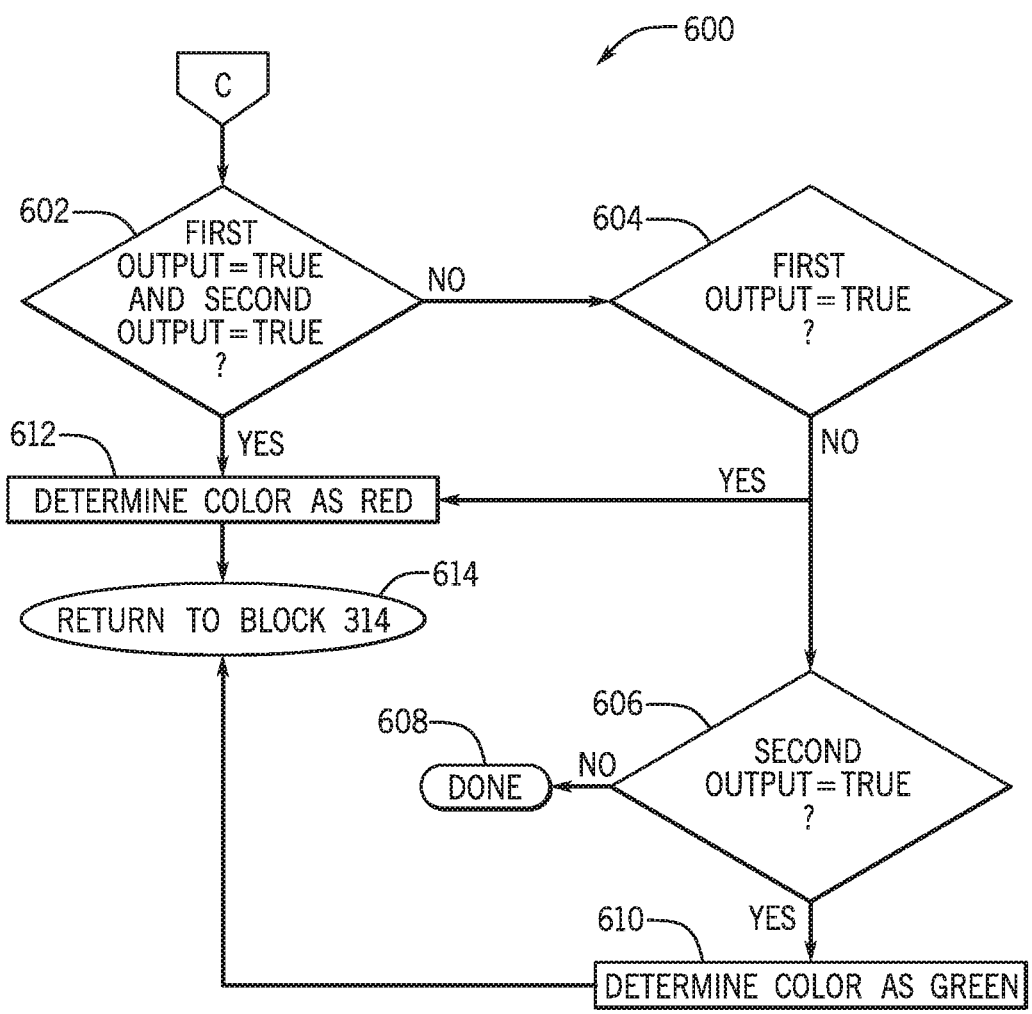
FIG. 6 is a flow chart of a method for determining a color of a color portion of a traffic indicator(s) according to an exemplary embodiment.

Block 314 will now be described with reference to FIG. 6, which illustrates a method 600 for determining a color of a color portion of a traffic indicator according to an exemplary embodiment. At block 602, the method 600 includes determining if the first output value is equal to true and the second output value is equal to true. Said differently, the processor 110 can determine whether a red color and a green color are simultaneously detected in the image (e.g., in a single frame). If the determination at block 602 is NO, the method 600 can proceed to block 604 to evaluate the first output value and the second output value separately to determine if either value is set to true.

Figure 3:
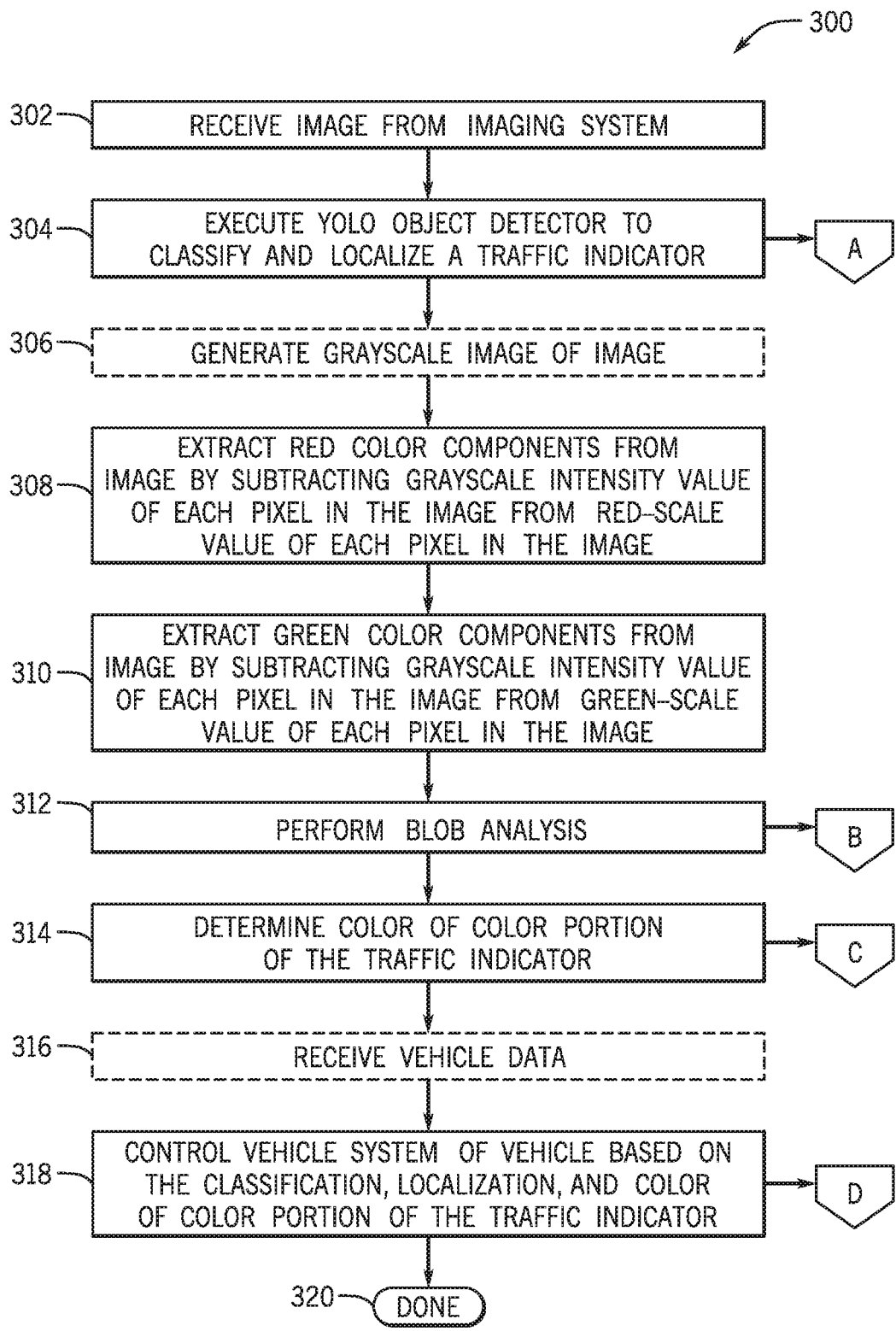
FIG. 3 is a flow chart of a method for vehicle control based on traffic indicator classification, localization, and color detection according to an exemplary embodiment.

Otherwise, if the determination at block 602 is YES, the color of the color portion of the traffic indicator is determined to be a red color at block 612, and the method 600 at block 614 can return to block 314 of FIG. 3. Said differently, upon the processor 110 detecting a red color and a green color simultaneously in the image (i.e., the first output value is true and the second output value is true), the color of the color portion of the traffic indicator is determined to be the red color. Thus, red color is given priority in situations where the image includes red and green color portions. As an illustrative example, and with reference to FIG. 2D, the image 226 includes a green color (i.e., the green light signal 210*a*) and a red color (i.e., the first traffic indicator 216*a*, the second traffic indicator 216*b*, and the third traffic indicator 216*c*). Accordingly, although both the first output value is true and the second output value is true for the image 226, the determination of the color portion of the traffic indicator is determined to be the red color (e.g., the red color is given priority over the green color) at block 612.

Referring again to block 604, it is determined whether the first output value is equal to true. If the determination at block 604 is YES, the color of the color portion of the traffic indicator is determined to be red at block 612, and the method 600 can return to block 314 of FIG. 3. If the determination at block 604 is NO, the method 600 proceeds to block 606 to determine whether the second output value is equal to true. If the determination at block 606 is NO, the method 600 can terminate at block 608. Otherwise, if the determination at block 606 is YES, the color of the color portion of the traffic indicator is determined to be green at block 610, and the method 600 can return to block 314 of FIG. 3.

As discussed herein and with reference again to FIG. 3, control of one or more of the vehicle systems 108 can be based on the classification and localization of traffic indicator(s) executed at block 304 and the color determined at block 314 in addition to information about the vehicle 102. Accordingly, at block 316, the method 300 can optionally include receiving vehicle data, from for example, the vehicle systems 108. In some embodiments the vehicle data can include data about a driver (not shown) of the vehicle 102. For example, the vehicle data can include a head pose of the driver of the vehicle 102, received from, for example, a driver monitoring system and/or a head tracking system. In other embodiments, the vehicle data can include the speed of the vehicle 102 received from, for example, an accelerometer. The speed of the vehicle 102 can be used to determine whether the vehicle 102 is in a moving state or a non-moving (e.g., stopped) state. In other embodiments, braking information from a braking system can be used to determine whether the vehicle is in a moving state or a non-moving state.

At block 318, the method 300 can include controlling a vehicle system of a vehicle 102 based on the classification, localization, and color of the color portion of the traffic indicator. More specifically, the processor 110 can execute control of one or more of the vehicle systems 108 of the vehicle 102 based on the classification, localization, and color of the color portion of the traffic indicator. For example, if the traffic indicator is classified as a traffic light, is localized within fifteen feet in front of the vehicle 102*a*, and the color portion of the traffic indicator is determined to be red, the processor 110 can control one or more vehicle systems 108 to provide an alert (e.g., visual, audible, tactile) to the driver to stop the vehicle 102 based on the presence of the red traffic light fifteen feet ahead of the vehicle 102.

As an illustrative example, if the vehicle 102 is approaching the traffic indicator 204 of FIG. 2D, the processor 110 can analyze the YOLO data provided by the neural network 122 and determine the classification of the traffic indicator 204 as a traffic light and the classification of the traffic indicator 206 as a light signal of the traffic light. The processor 110 can further analyze the YOLO data and determine the location of the traffic indicators 204 and 206 based on the localization completed (as discussed in FIG. 4) to determine that the traffic indicators 204, 206 are located a few feet ahead of the vehicle 102. Additionally, the processor 110 can determine that the color of the color portion 224 of the traffic indicator 206 is red. The processor 110 can thereby control the vehicle systems 108 of the vehicle 102 to alert the driver based on the classification, localization, and color of the traffic indicator 206. Further, as discussed above, in some embodiments, controlling the vehicle system 108 of the vehicle 102 can include controlling the vehicle system 108 of the vehicle 102 based on the classification, localization, and color of the color portion of the traffic indicator.

Figures 7, 8:
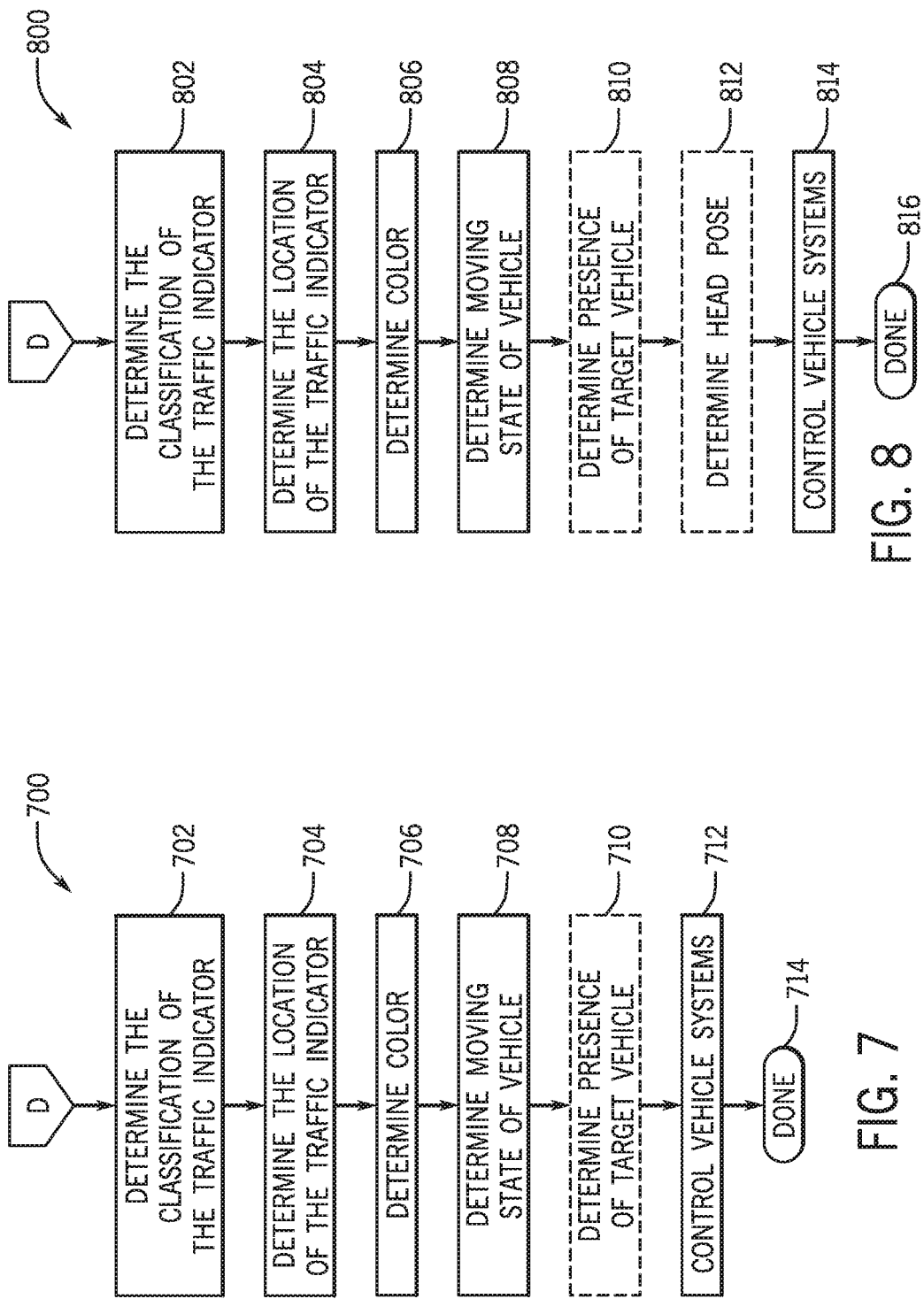
FIG. 7 is a flow chart of a method for controlling a vehicle system based on a classification, a location, and a color of the color portion of a traffic indicator according to an exemplary embodiment.
FIG. 8 is a flow chart of another method for controlling a vehicle system based on a classification, a location, and a color of the color portion of a traffic indicator according to an exemplary embodiment.

Exemplary control based on the color of the color portion of the traffic indicator and/or the vehicle data will now be described with respect to FIGS. 7 and 8. FIG. 7 is a flow chart of a method 700 for controlling the vehicle system 108 based on classification, localization, and a color of the color portion of a traffic indicator according to an exemplary embodiment. At block 702, the method 700 includes determining the classification of the traffic indicator. As discussed above, the neural network processing unit 124 of the neural network 122 can communicate YOLO data to the processor 110 of the vehicle 102. The YOLO data can include data that pertains to the classification of one or more objects located within the surrounding environment of the vehicle 102 that can include one or more traffic indicators.

The method 700, can proceed to block 704, wherein the method 700 can include determining the location of the traffic indicator. In one embodiment, the processor 110 can further analyze the YOLO data to determine localization information pertaining to one or more (classified) objects within the surrounding environment of the vehicle 102 that also include the traffic indicator. The localization of the traffic indicator can allow the processor 110 to determine the location of the traffic indicator with respect to the vehicle 102.

The method 700 can proceed to block 706, wherein the method 700 can include determining the color of the color portion of the traffic indicator. In one embodiment, the processor 110 can determine if the color is a red color or a green color based on performance of the blob analysis, as discussed above. At block 708, the method 700 can include determining a moving state of the vehicle 102. In an exemplary embodiment, the processor 110 can determine if the vehicle 102 is in a moving state (e.g., the vehicle 102 is moving and/or the vehicle 102 is travelling above a predetermined speed) or a non-moving state (e.g., the vehicle 102 is stopped and/or the vehicle 102 is travelling below a predetermined speed). A moving state of the vehicle 102 can be determined based on vehicle data (e.g., braking information, speed information) from the vehicle systems 108 (e.g., received at block 316 of FIG. 3). The method 700 can then proceed to block 712 and/or optionally proceed to block 710.

As mentioned above, the method 700 can optionally include block 710. At block 710, the method 700 can include determining if a target vehicle exists in front of the vehicle 102 (e.g., FIG. 2B, 2D). The determination at block 710 can be made based on the analysis of the YOLO data provided to the processor 110 by the neural network 122. More specifically, the processor 110 can analyze the YOLO data to determine if one or more objects detected, classified, and localized using YOLO object detection includes a target vehicle. Accordingly, the processor 110 can determine if a target vehicle exists and is located in front of the vehicle 102. Additionally, the processor 110 can determine the specific location of the target vehicle with respect to the vehicle 102 (e.g., distance between the front portion of the vehicle 102 and a rear portion of a classified target vehicle).

The method 700 can then proceed to block 712, where the method 700 can include controlling the vehicle systems 108 based on the presence of the classified target vehicle, the location of the target vehicle, the color of the color portion of a traffic indicator of the target vehicle, and a moving state of the vehicle 102. As an illustrative example, the vehicle 102 can be moving towards (moving-state) an intersection with a target vehicle located eight feet ahead of the vehicle 102. Upon determining the color of the color portion of a traffic indicator classified as a brake light is red, the processor 110 can control the vehicle systems 108 to provide an alert to the driver to inform the driver to slow down and stop the vehicle 102 based on the presence of the target vehicle, the classification of the brake light, the activation of the (red) brake light), and the location of the target vehicle with respect to the vehicle 102 (as eight feet ahead of the vehicle 102). Alternatively, the processor 110 can provide autonomous control of the vehicle systems 108. For example, the processor 110 can control the vehicle systems 108 to automatically begin slowing down and stopping the vehicle 102 based on the presence of the target vehicle, the classification of the brake light, the activation of the (red) brake light), and the location of the target vehicle with respect to the vehicle 102.

Referring now to FIG. 8, a flow chart of a method 800 for controlling the vehicle system 108 based on classification, localization, and a color of the color portion of a traffic indicator according to another exemplary embodiment will be described. In particular, the method 800 can include controlling the vehicle system 108 based on the classification of the traffic indicator, the location of the traffic indicator, the color of the color portion of the traffic indicator, vehicle information, and information about a driver of the vehicle 102.

At block 802, the method 800 can include determining the classification of the traffic indicator. As discussed above, the neural network processing unit 124 of the neural network 122 can communicate YOLO data to the processor 110 of the vehicle 102. The YOLO data can include data that pertains to the classification of one or more objects located within the surrounding environment of the vehicle 102 that can include one or more traffic indicators.

The method 800 can proceed to block 804, wherein the method 800 can include determining the location of the traffic indicator. In one embodiment, the processor 110 can further analyze the YOLO data to determine localization information pertaining to one or more (classified) objects within the surrounding environment of the vehicle 102 that also include the traffic indicator. The localization of the traffic indicator can allow the processor 110 to determine the location of the traffic indicator with respect to the vehicle 102.

The method 800 can proceed to block 806, wherein the method 800 can include determining a color of the color portion of the traffic indicator. As discussed above, the processor 110 can determine if the color is a red color or a green color based on performing blob analysis. At block 808, the method 800 can include determining a moving state of the vehicle 102. For example, the processor 110 can determine if the vehicle 102 is in a moving state (e.g., the vehicle 102 is moving and/or the vehicle 102 is travelling above a predetermined speed) or a non-moving state (e.g., the vehicle 102 is stopped and/or the vehicle 102 is travelling below a predetermined speed). A moving state of the vehicle 102 can be determined based on vehicle data (e.g., braking information, speed information) from the vehicle systems 108 (e.g., received at block 316 of FIG. 3).

The method 800 can then proceed to block 814 and/or optionally proceed to blocks 810 and 812. At block 810, the method 800 can include determining if a target vehicle exists in front of the vehicle 102 (e.g., FIG. 2B, 2D). The determination at block 810 can be made based on the analysis of the YOLO data provided to the processor 110 by the neural network 122. More specifically, the processor 110 can analyze the YOLO data to determine if one or more objects detected, classified, and localized using YOLO object detection includes a target vehicle. Accordingly, the processor 110 can determine if a target vehicle exists and is located in front of the vehicle 102. Additionally, the processor 110 can determine the specific location of the target vehicle with respect to the vehicle 102 (e.g., distance between the front portion of the vehicle 102 and a rear portion of a classified target vehicle).

At block 812, the method 800 can include determining a head pose of a driver. For example, as discussed herein, the processor 110 can receive information about a driver of the vehicle 102 from the vehicle systems 108 (e.g., at block 316 of FIG. 3). In some embodiments, head pose data can be received from driving monitoring systems and/or head tracking systems. In some embodiments, the processor 110 can determine a direction of the head pose of a driver, for example, upward, downward, to the left and/or to the right. In some embodiments, the processor 110 can analyze the head pose to determine if the head pose of the driver is indicative of the driver viewing the classified and localized object, such as the target vehicle and/or a traffic indicator. In some embodiments, if the head pose of the driver is in a downward direction, it may be determined that the driver is distracted from the primary task of driving the vehicle 102.

At block 814, the method 800 can include controlling the vehicle systems 108, based on the classification of the traffic indicator, the location of the traffic indicator, a color of the color portion of the traffic indicator, the presence of a target vehicle, and driver information (e.g., head pose). As an illustrative example, if the color portion of the classified and localized traffic indicator is green, the vehicle 102 is in a non-moving state (e.g., stopped and/or travelling below a predetermined speed), a target vehicle is not present in front of the vehicle 102, and the head pose of the driver is directed away from the traffic indicator, the processor 110 can control the vehicle systems 108 to provide an alert to the driver to inform the driver to begin moving the vehicle 102.

Alternatively, the processor 110 can provide autonomous control of the vehicle systems 108. For example, upon determining the color of the color portion of the traffic indicator is green, no target vehicle is located in front of the vehicle 102, and the head pose of the driver is directed away from the location of the traffic indicator with respect to the vehicle 102, the processor 110 can control the vehicle systems 108 to automatically begin moving the vehicle 102 in a forward direction. In this illustrative example, the head post of the driver being directed in a different direction than the location of the traffic indicator presenting the green traffic light with respect to the vehicle 102 (as determined based on the execution of the YOLO object detection) can indicate that the driver is not paying attention to the traffic indicator presenting the green traffic light. Thus, the vehicle systems 108 are controlled to alert the driver.

Figure 9:
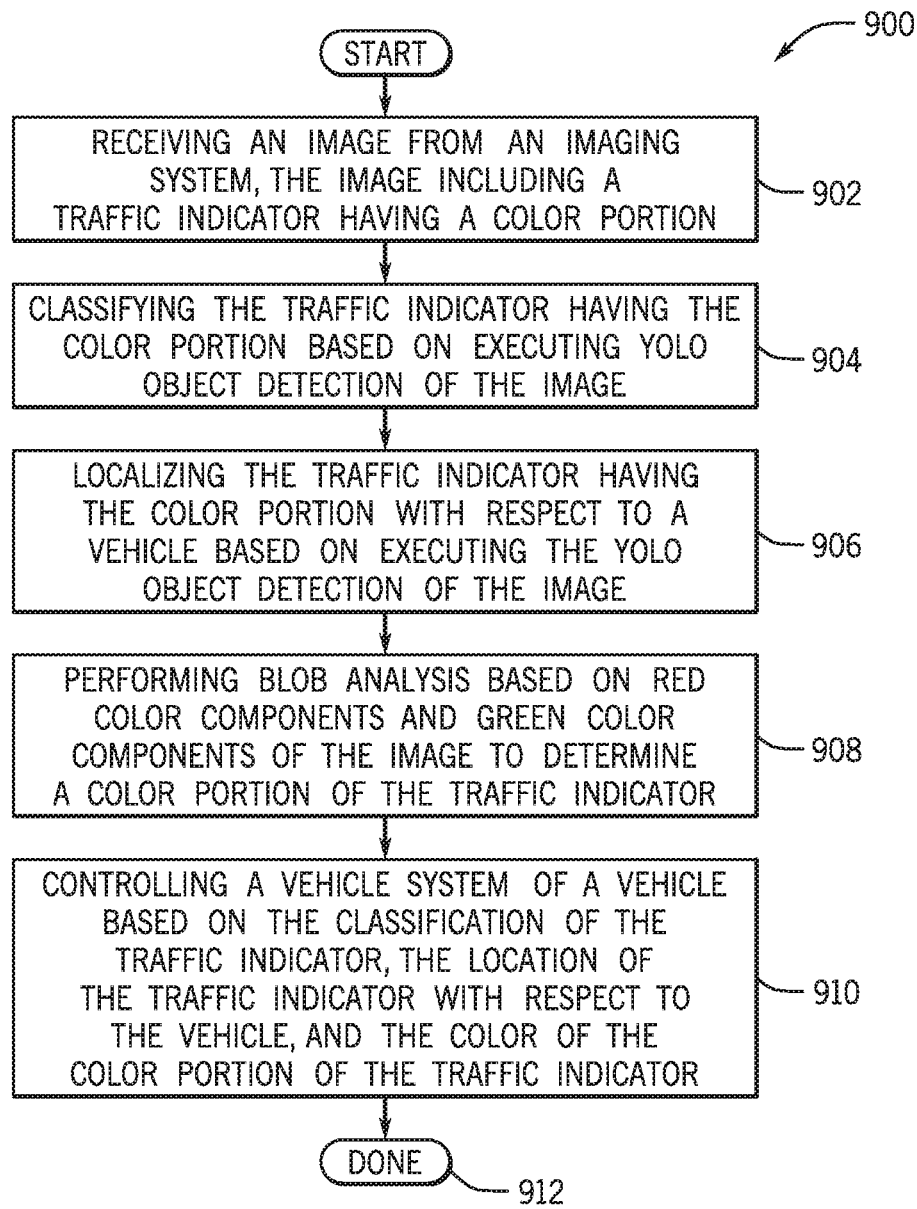
FIG. 9 is a flow chart of a method for vehicle control according to an exemplary embodiment.

FIG. 9 is a flow chart of a method for vehicle control according to an exemplary embodiment. FIG. 9 will be described with reference to the components of FIG. 1, though it is to be appreciated that the method 900 of FIG. 9 can be used with other systems/components. The method 900 can begin at block 902, wherein the method can include receiving an image from an imaging system 106. In one embodiment, the image can include a traffic indicator having a color portion.

The method 900 can proceed to block 904, wherein the method 900 can include classifying the traffic indicator having the color portion based on executing YOLO object detection of the image. The method 900 can proceed to block 906, wherein the method 900 can include localizing the traffic indicator having the color portion with respect to a vehicle based on executing the YOLO object detection of the image.

The method 900 can proceed to block 908, wherein the method 900 can include performing blob analysis based on red color components and green color components of the image to determine a color portion of the traffic indicator. The method 900 can proceed to block 910, wherein the method 900 can include controlling a vehicle system of a vehicle based on the classification of the traffic indicator, the location of the traffic indicator with respect to the vehicle, and the color of the color portion of the traffic indicator.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for vehicle control, comprising:
   receiving an image from an imaging system, the image including a traffic indicator having a color portion;
   classifying the traffic indicator having the color portion based on executing You Only Look Once (YOLO) object detection of the image;
   localizing the traffic indicator having the color portion with respect to a vehicle based on executing the YOLO object detection of the image;
   performing Binary Large Object (blob) analysis based on red color components and green color components of the image to determine a color of the color portion of the traffic indicator; and
   controlling a vehicle system of the vehicle based on the classification of the traffic indicator, the location of the traffic indicator with respect to the vehicle, and the color of the color portion of the traffic indicator.

2. The computer-implemented method of claim 1, wherein the image is divided into S×S grid cells and a predetermined number of bounding boxes are computed for each grid cell.

3. The computer-implemented method of claim 2, wherein a confidence score is computed for each of the predetermined number of bounding boxes that are computed for each grid cell.

4. The computer-implemented method of claim 3, wherein a null value confidence score is assigned to at least one bounding box of the predetermined number of bounding boxes based on a determination that the at least one bounding box does not include any portion of the traffic indicator.

5. The computer-implemented method of claim 3, wherein classifying the traffic indicator includes computing at least one new bounding box around the traffic indicator, wherein the new bounding box is included on areas of the image that include grid cells that include the traffic indicator.

6. The computer-implemented method of claim 5, wherein classifying the traffic indicator includes computing class predictions for the at least one new bounding box, wherein the class predictions are computed based on accessing a data set stored on a neural network machine learning database.

7. The computer-implemented method of claim 5, wherein localizing the traffic indicator includes providing localization data with locational coordinates of the traffic indicator captured within the image with respect to a location and position of the vehicle.

8. The computer-implemented method of claim 1, wherein performing blob analysis includes setting a first output value to true upon detecting a red blob and a second output value to true upon detecting a green blob, wherein upon determining the first output value is true and the second output value is true, the color of the color portion of the traffic indicator is determined to be a red color.

9. The computer-implemented method of claim 1, wherein performing blob analysis includes determining that a color of the color portion of the traffic indicator is determined to be a red color upon detecting the red color and a green color simultaneously in the image.

10. A system for vehicle control, comprising:
a memory storing instructions when executed by a processor cause the processor to:
receive an image from an imaging system, the image including a traffic indicator having a color portion;
classify the traffic indicator having the color portion based on executing You Only Look Once (YOLO) object detection of the image;
localize the traffic indicator having the color portion with respect to a vehicle based on executing the YOLO object detection of the image;
perform Binary Large Object (blob) analysis based on red color components and green color components of the image to determine a color of the color portion of the traffic indicator; and
control a vehicle system of the vehicle based on the classification of the traffic indicator, the location of the traffic indicator with respect to the vehicle, and the color of the color portion of the traffic indicator.

11. The system of claim 10, wherein the image is divided into S×S grid cells and a predetermined number of bounding boxes are computed for each grid cell.

12. The system of claim 11, wherein a confidence score is computed for each of the predetermined number of bounding boxes that are computed for each grid cell.

13. The system of claim 11, wherein a null value confidence score is assigned to at least one bounding box of the predetermined number of bounding boxes based on a determination that the at least one bounding box does not include any portion of the traffic indicator.

14. The system of claim 13, wherein classifying the traffic indicator includes computing at least one new bounding box around the traffic indicator, wherein the new bounding box is included on areas of the image that include grid cells that include the traffic indicator.

15. The system of claim 14, wherein classifying the traffic indicator includes computing class predictions for the at least one new bounding box, wherein the class predictions are computed based on accessing a data set stored on a neural network machine learning database.

16. The system of claim 14, wherein localizing the traffic indicator includes providing localization data with locational coordinates of the traffic indicator captured within the image with respect to a location and position of the vehicle.

17. The system of claim 10, wherein performing blob analysis includes setting a first output value to true upon detecting a red blob and a second output value to true upon detecting a green blob, wherein upon determining the first output value is true and the second output value is true, the color of the color portion of the traffic indicator is determined to be a red color.

18. The system of claim 10, wherein performing blob analysis includes determining that a color of the color portion of the traffic indicator is determined to be a red color upon detecting the red color and a green color simultaneously in the image.

19. A non-transitory computer readable storage medium storing instructions that when executed by a computer, which includes a processor perform a method, the method comprising:
receiving an image from an imaging system, the image including a traffic indicator having a color portion;
classifying the traffic indicator having the color portion based on executing You Only Look Once (YOLO) object detection of the image;
localizing the traffic indicator having the color portion with respect to a vehicle based on executing the YOLO object detection of the image;
performing Binary Large Object (blob) analysis based on red color components and green color components of the image to determine a color of the color portion of the traffic indicator; and
controlling a vehicle system of the vehicle based on the classification of the traffic indicator, the location of the traffic indicator with respect to the vehicle, and the color of the color portion of the traffic indicator.

20. The non-transitory computer readable storage medium of claim 19, wherein performing blob analysis includes determining that a color of the color portion of the traffic indicator is determined to be a red color upon detecting the red color and a green color simultaneously in the image.

* * * * *